(12) United States Patent
Escowitz et al.

(10) Patent No.: US 11,279,061 B2
(45) Date of Patent: Mar. 22, 2022

(54) PREFORM-CHARGE CARTRIDGES AND SERIALIZATION METHODS THEREFOR

(71) Applicant: Arris Composites Inc., Berkeley, CA (US)

(72) Inventors: Ethan Escowitz, Berkeley, CA (US); J. Scott Perkins, Oakland, CA (US); Erick Davidson, Piedmont, CA (US); Riley Reese, Carpinteria, CA (US); Sam Pirahanchi, Berkeley, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 16/896,028

(22) Filed: Jun. 8, 2020

(65) Prior Publication Data
US 2020/0384667 A1 Dec. 10, 2020

Related U.S. Application Data

(60) Provisional application No. 62/870,522, filed on Jul. 3, 2019, provisional application No. 62/858,049, filed on Jun. 6, 2019.

(51) Int. Cl.
*B65D 81/02* (2006.01)
*B29C 33/00* (2006.01)
*B29C 70/08* (2006.01)
*B29C 43/58* (2006.01)
*B29C 43/34* (2006.01)
*B65D 81/00* (2006.01)
(Continued)

(52) U.S. Cl.
CPC .......... *B29C 33/0061* (2013.01); *B29C 43/34* (2013.01); *B29C 43/58* (2013.01); *B29C 70/08* (2013.01); *B65D 57/002* (2020.05); *B65D 81/00* (2013.01); *B65D 81/02* (2013.01); *B65D 81/05* (2013.01); *B65D 81/18* (2013.01); *B65D 57/00* (2013.01); *B65D 2303/00* (2013.01); *G05B 19/4183* (2013.01)

(58) Field of Classification Search
CPC ........ B65D 1/24; B65D 1/36; B65D 2303/00; B65D 2577/048; B65D 57/00; B65D 57/002; B65D 77/046; B65D 81/05
USPC .......................................................... 206/725
See application file for complete search history.

(56) References Cited

U.S. PATENT DOCUMENTS 5,346,518 A * 9/1994 Baseman ................. B65G 1/00
206/204
6,202,883 B1 * 3/2001 Narazaki ........... H01L 21/67333
206/706
(Continued)

FOREIGN PATENT DOCUMENTS

CN 108216862 A * 6/2018

OTHER PUBLICATIONS

Authorized Officer Blaine R. Copenheaver, International Search Report issued in PCT Patent Application No. PCT/US2020/036694 dated Sep. 2, 2020.

*Primary Examiner* — Mollie Impink
(74) *Attorney, Agent, or Firm* — Kaplan Breyer Schwarz, LLP

(57) ABSTRACT

A cartridge for storing and transporting fiber-bundle-based preform charges includes a plurality of cells arranged within the housing, wherein each cell is physically adapted to receive a preform charge and prevent it from moving therein as the cartridge is transported. In some embodiments, the cartridge and preform charges it conveys are serialized.

20 Claims, 13 Drawing Sheets

(51) Int. Cl.
*B65D 81/18* (2006.01)
*B65D 57/00* (2006.01)
*B65D 81/05* (2006.01)
*G05B 19/418* (2006.01)

(56) References Cited

U.S. PATENT DOCUMENTS

| | | | |
|---|---|---|---|
| 2006/0032902 A1* | 2/2006 | Kou | H05K 13/084 |
| | | | 235/376 |
| 2009/0212469 A1 | 8/2009 | Thottupurathu | |
| 2011/0004338 A1* | 1/2011 | Bianco | G07F 11/62 |
| | | | 700/235 |
| 2011/0240213 A1 | 10/2011 | Barlag et al. | |
| 2012/0018347 A1* | 1/2012 | Ku | H01L 21/67353 |
| | | | 206/710 |
| 2012/0103860 A1* | 5/2012 | Masuko | H01L 21/67373 |
| | | | 206/524.6 |
| 2012/0269999 A1 | 10/2012 | Kind et al. | |
| 2014/0166532 A1* | 6/2014 | Sugimoto | B65D 71/70 |
| | | | 206/703 |
| 2014/0224809 A1 | 8/2014 | Loukus et al. | |
| 2020/0108529 A1 | 4/2020 | Davidson et al. | |
| 2020/0108568 A1 | 4/2020 | Davidson et al. | |
| 2020/0114596 A1 | 4/2020 | Davidson et al. | |
| 2020/0130297 A1 | 4/2020 | Escowitz et al. | |

* cited by examiner

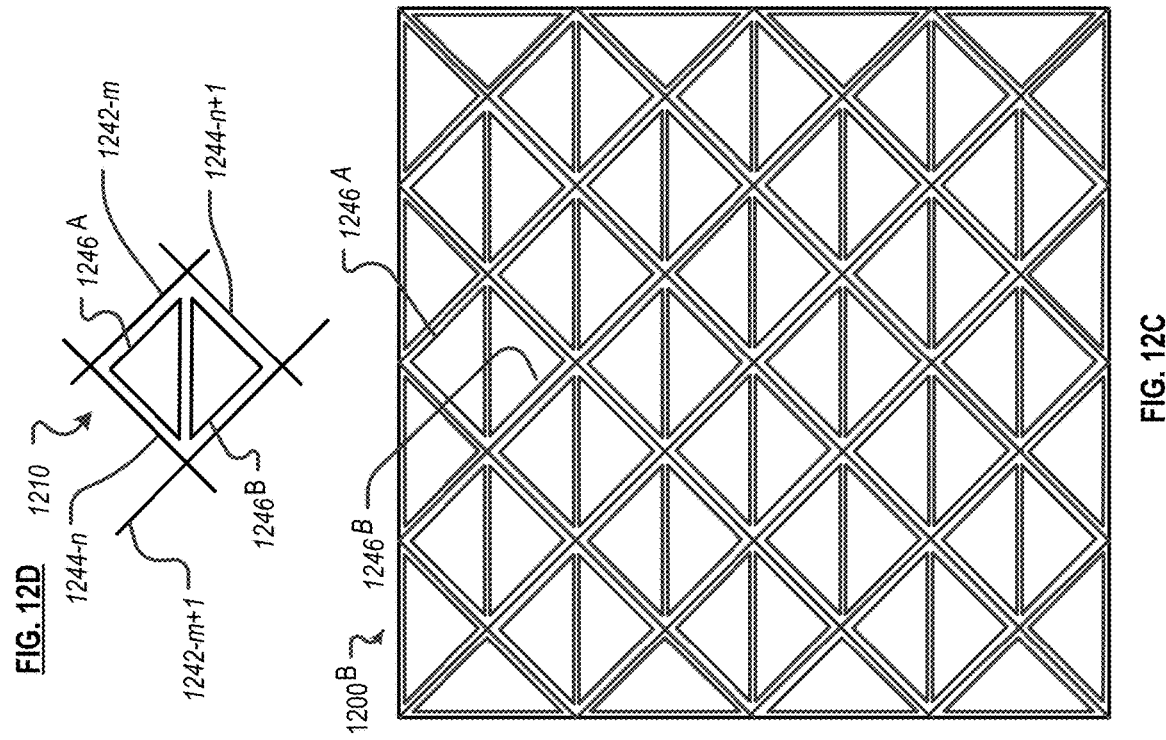
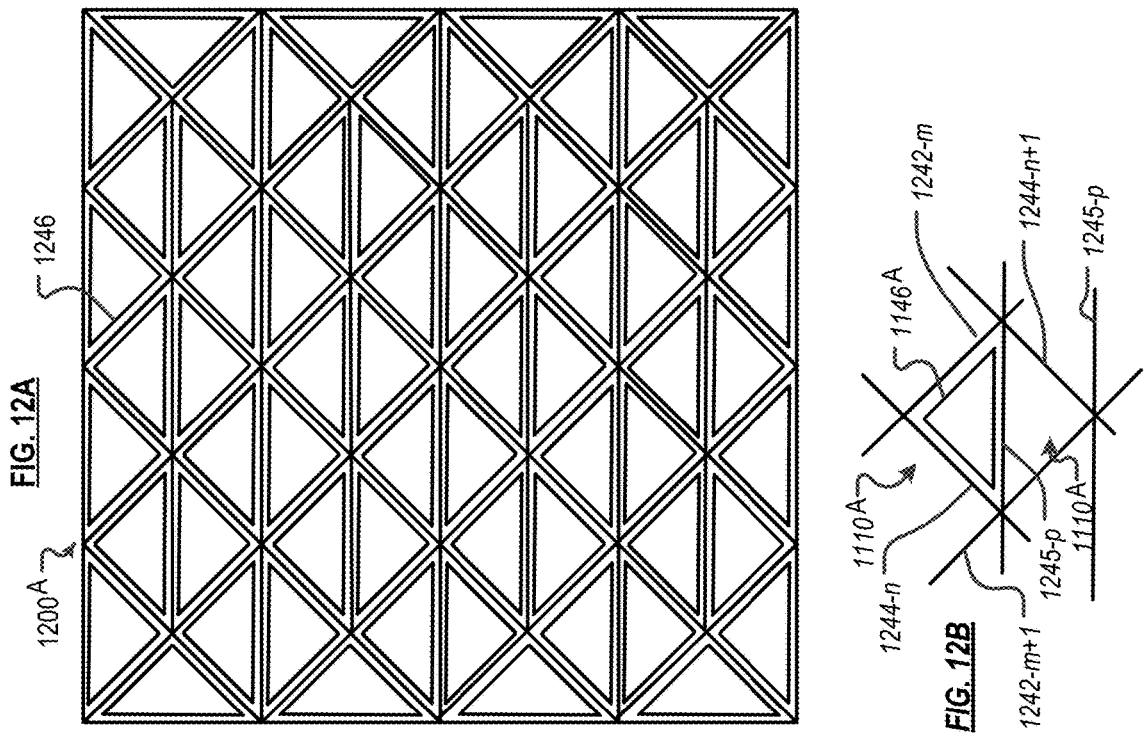

PREFORM-CHARGE CARTRIDGES AND SERIALIZATION METHODS THEREFOR

STATEMENT OF RELATED CASES

Priority is claimed to U.S. Patent Applications 62/858,049 filed Jun. 6, 2019, and 62/870,522 filed Jul. 3, 2019, both of which application are incorporated by reference herein.

FIELD OF THE INVENTION

The present invention relates to additive molding of fiber-composite materials.

BACKGROUND

A "preform" is a structural precursor used in some molding processes to form a finished part. Using a preform simplifies certain molding processes because a preform is provided with a configuration that bears some relation to the intended final form of a part being molded.

Existing preforms are typically flat tapes or laminate sheets that are cut to a specific size and shape, consistent with a part being fabricated. In some cases, an assemblage of preforms is created, typically by layering the laminate sheets or flat segments of tape. After formation, the preforms or assemblages are placed into a mold cavity for forming a part. The use of the assemblages, as opposed to individual preforms, speeds the process of laying up the constituent materials in the mold cavity.

This sequence assumes that the molding process, as well as the apparatus that creates the preforms/assemblages, are integrated with one another or at least in the general proximity of one another. Yet, in certain business models, it is financially advantageous to decouple preform production from the molding process. Consequently, a need arises to transport material between suppliers and manufacturers in a reliable and consistent manner.

SUMMARY

Applicant has been developing techniques and processes that speed the production and performance, via compression molding, of high-volume, fiber-composite parts. For example, applicant has disclosed preforms that are appropriately sized and shaped segments of resin-infused fiber bundles, rather than flat tape or laminate sheets. The properties of a fiber-composite part are a function of, among other parameters, the type, geometry, and relative orientations of its constituent materials. Applicant's preforms, when used for example in conjunction with a compression molding process, provide an unprecedented level of control over such parameters. This enables the production of very high-performance parts, and a greatly enhanced ability to design a part having desired specifications. See, for example, Published Patent Applications US2020/0108529, US2020/0108568, US2020/0130297, and U.S. patent application Ser. No. 16/857,710.

There are drawbacks to the use of preforms, some of which are relatively unique to applicant's fiber-bundle-based preforms. For example, after placement in a mold, individual fiber-bundle-based preforms often tend to move out of their desired position/alignment as a consequence of their form factor. And once the mold is closed, it is typically not possible to determine if such movement has occurred. To address this issue, as well as for the efficiency concerns generally applicable to the layup of preforms versus assemblages thereof, applicant developed the "preform charge." A preform charge is an assemblage of fiber-bundle-based preforms, formed by "tacking" together plural preforms. The preform charge thus effectively becomes a single unit. See, for example, Published Patent Application US2020/0114596, and U.S. patent application Ser. No. 16/877,236.

Rather than having a simple form like the tape- or sheet-based assemblages of the prior art, applicant's preform charges often have relatively complex 3D shapes that are built up from what is often effectively a 1D shape (i.e., the fiber-bundle-based preforms). Preform charges having such complex shapes cannot be spooled or readily stacked in box like prior-art assemblages. Consequently, a new approach for transporting preform charges was required.

Embodiments of the invention provide a preform-charge cartridge for storing and/or transporting a plurality of individual preforms or preform charges (hereinafter collectively referenced as "preform charges"). These preform charges may be transported to a compression-molding facility, where the cartridge couples to a docking station, and wherein the preform charges are ultimately inserted into a mold either one-by-one, such as in a particular order/arrangement, or together as a batch, as a function of the materials-handling capabilities at the parts-manufacturer's facility. The preform-charge cartridge is physically adapted to provide one or more of the following functions:

(i) facilitate ingress and egress of each preform charge to/from the cartridge;

(ii) maintain the shape of each individual preform charge stored therein;

(iii) ensure that individual constituents of a preform charge (i.e., the preforms) do not separate from one another;

(iv) maintain the position of each preform charge relative to other preform charges being transported;

(v) maintain the position of each preform charge relative to the transport device, preserving fiber alignment. In other words, preform charges may be placed in the cartridge in a specific orientation, which orientation must be maintained during transit;

(vi) register a preform charge with a specific compartment in the cartridge;

(vii) register the transport device to a molding apparatus; and (viii) provide data transfer.

To provide the aforementioned functions, in the illustrative embodiment, the cartridge includes a plurality of cells, each for receiving a respective preform charge, wherein:

The shape of the cell, or an element thereof, is physically adapted to prevent a preform-charge stored therein from moving during transit (addressing, at least in part, functions "ii," "iii," "iv," and "v" above).

The shape of the cell, or an element thereof, is physically adapted to facilitate ingress and/or egress of a preform charge (addressing, at least in part, function "i" above).

The cartridge includes one or more ingress/egress features distinct from the shape of the cell (addressing, at least in part, function "i" above).

The cartridge includes one or more first indexing features for indexing each preform charge with a particular location within the cartridge (addressing function "vi" above).

The cartridge includes one or more second indexing features for placing the cartridge and a molding apparatus in a predetermined and well-defined location/orientation relative to one another (addressing function "vii" above).

The cartridge includes actuating features that initiate actions/features when the cartridge and the docking station engage one another, such as egress features, or information transfer, for appropriately equipped cartridges (addressing, at least in part, function "i" above).

The cartridge includes a processor/memory running software for interfacing with a manufacturer's automated mold-loading process to:
- control the dispensing of the preform charges (addressing, at least in part, function "i" above);
- provide, at least in part, the one or more first indexing features (addressing function "vi" above; and
- provide, at least in part, serialization (addressing, at least in part, function "viii" above".

These features ensure repeatable and consistent transfer of preform charges from a supplier's preform charge-assembly process to a part manufacturer's molding process. The aforementioned features can be passive or active. When molding parts to which applicant's preform charges are uniquely applicable (i.e., geometry of the preform charge keyed to the geometry of the mold), such automated loading is only practical, or even possible, when at least some of the aforementioned features, such as an appropriately shaped cell 210, ingress/egress features 214, and second indexing features 216 are provided.

Additionally, in some embodiments, the preform charge cartridge includes moisture-blocking and sealing features, to maintain the quality of the preform charges will in transport. In some embodiments, the preform charge cartridge contains various electronics and/or sensors for monitoring the preform charges, such as hygrometers, cameras, weigh scales, and the like.

As is the case in any manufacturing sector, process efficiency benefits from supply-chain analytics. To best inform quality metrics, financial impacts, customer satisfaction, and raw-material sourcing, manufacturers of compression-molded parts use numerous "serialization" methods—the use of serial numbers—to track and monitor the progression of materials through their processes. Consequently, some embodiments of the invention provide a serialized preform charge cartridge and associated methods.

The general premise of serialization methods is to correlate finished parts to the respective batches of raw material from a supplier. If a customer identifies issues with such a serialized part, the information accompanying the part can be used to trace its manufacturing history as a means to identify the root cause(s) of the issue. Furthermore, thorough serialization of molded parts provides significant advantages when conducting internal or external audits of a process, as often required by customers. Imparted serial information can include, but is not limited to, bar codes, identification numbers and/or characters, regulatory information, and the like.

Serialization methods of compression-molded parts impart the requisite information to individual molded parts in a variety of ways. Serialization can be imparted either during molding (etched into the surface of the mold) or afterward (etched directly on to a part). Or an RFID chip can be over-molded into the part.

Manufacturers commonly employ a quality-management system (QMS) to track and archive part serialization and associated processing conditions, irrespective of the serialization method used. The approach adopted for serialization is a function of customer requirements and manufacturer capabilities. All approaches convey the information required by the relevant stakeholders.

The applicant recognized that its preform charges, by virtue of their complexity versus the prior art, may present additional impediments to such supply-chain analytics. In particular, tracking the flow of material across the processes of multiple suppliers is often an operational impedance, and risks the loss of vital information. Consider that existing compression-molding processes may only require information regarding the source of the raw material, whereas applicant's compression-molding processes, and those employing applicant's preform charges, require additional information. In this regard, each of applicant's preform charges within the preform charge cartridge is not simply a group of thermoplastic pellets or tape segments or sheets, as in the prior art, but rather a manufactured structure having a far more complex geometry by comparison, and described by certain parameters. Embodiments of the invention thus address the unique informational and serialization needs arising from the production, shipment, and molding of applicant's preform charges.

In particular, for applicant's preform charges, an end customer (i.e., the purchaser of the part) may require transparency to (i) the process that manufactured the constituents (e.g., towpreg, etc.) used to mold the part, (ii) the process that manufactured the preform charges, and (iii) the compression-molding process that produced the finished part. This requires an ability to transfer processing information from (i)→(ii)→(iii)→Purchaser of the part.

Embodiments of the invention enable existing serialization methods used in compression molding to be interfaced with the use of applicant's preform charge cartridges. This integration enables the transfer of information as noted above. Transferred information can include, without limitation, any one or more of:
- raw material (e.g., resin, fiber, towpreg, etc.) supply data;
- preform-charge manufacturing conditions;
- preform-charge quality data;
- materials-handling history;
- location;
- specified compression-molding parameters;
- actual compression molding parameters;
- part-quality data;
- statistical process-control feedback;
- data authentication certificates;
- purchase order data.

Thus, in some embodiments, the serialization methods disclosed herein are combined with applicant's preform-charge cartridges, to achieve various process efficiencies. Collectively, an approach to managing the quantification, analysis, logistics, and/or financials of high-volume production is therefore provided. It is notable that, as applicable, the serialization methods disclosed herein may be used for applications other than preform charges/preform charge cartridges.

In summary, some embodiments of the invention provide a preform-charge cartridge. In some of these embodiments, the preform-charge cartridge is serialized, and in others, it is not serialized. Furthermore, some embodiments of the invention provide serialization methods for use with a preform-charge cartridge.

More particularly, in some embodiments, the invention provides a cartridge for storing and conveying a plurality of preform charges, the cartridge comprising:
a housing; and
a plurality of cells arranged within the housing, wherein each cell includes a retainer for receiving respective ones of the preform charges, the retainer comprising a first wall having a top and a bottom, wherein the bottom of the first wall defines a first perimeter, and wherein the first perimeter defines an first internal area, wherein by virtue of a shape of the first perimeter and dimensions of the first internal area, the retainer maintains the preform charge in an as-received orientation during conveyance of the cartridge.

In some further embodiments, the invention provides a cartridge for storing and conveying a plurality of preform charges, the cartridge comprising:
 a housing; and
 a plurality of cells arranged within the housing, wherein each cell is physically adapted to:
  a) receive a preform charge comprising an assemblage of fiber-bundle-based preforms, the preform charge having a first fiber alignment;
  b) prevent a received preform charge from moving within the cell, thereby maintaining the first fiber alignment during conveyance of the cartridge.

In some additional embodiments, the invention provides a cartridge for storing and conveying a plurality of preform charges, the cartridge comprising:
 a plurality of cells arranged within the housing, wherein each cell includes a retainer, wherein each retainer is physically adapted, by virtue of size and shape:
  (a) to receive a preform charge,
  (b) to maintain an orientation of the received preform charge, and
  (c) to maintain a location of the received preform charge relative to other preform charges received by other of the cells;
 at least one sensor, wherein the sensor assesses one of: a characteristic of the preform charges, a condition of the cartridge, and an ambient condition to which the cartridge is exposed; and
 one or more tags, wherein characterizing information pertaining to at least one of the plurality of preform charges or the cartridge is accessible via the one or more tags.

In a further embodiment, the invention provides a method for serializing a cartridge and a plurality of preform charges stored therein, the method comprising:
 receiving the cartridge containing the plurality of preform charges at a compression-molding facility, wherein the cartridge comprises:
  (a) a plurality of first tags, one first tag being associated with each preform charge, wherein preform-charge characterizing information for each preform charge is accessible via the respective first tag;
  (b) a second tag associated with the cartridge, wherein cartridge characterizing information for the cartridge is accessible via the second tag, the cartridge characterizing information comprising information pertaining to the cartridge and the preform charges stored therein, as well as information concerning conditions experienced by the cartridge during shipping from a facility that sent the cartridge to the compression molding facility;
 accepting or rejecting one or more of the preform charges based on whether requirements pertaining to the preform charges and the cartridge are satisfied, as determined from the preform-charge characterizing information accessed via the plurality of first tags, and the cartridge characterizing information accessed via the second tag;
 when accepted, molding parts from the preform charges in accordance with at least one of the preform-charge characterizing information and the cartridge characterizing information;
 monitoring molding conditions and testing the parts produced via the molding;
 updating the plurality of first tags with information pertaining to the monitoring and the testing; and
 updating the second tag with at least one of the following: information concerning the parts, a condition of the cartridge, and information pertaining to shipping to a parts purchaser.

BRIEF DESCRIPTION OF THE DRAWINGS

FIGS. 12A and 12B depict details of a first embodiment of preform-charge cartridge $1100^A$ of FIG. 11A.

FIGS. 12C and 12D depict details of a second embodiment of cartridge $1100^A$ of FIG. 11A.

DETAILED DESCRIPTION

Figure 1:
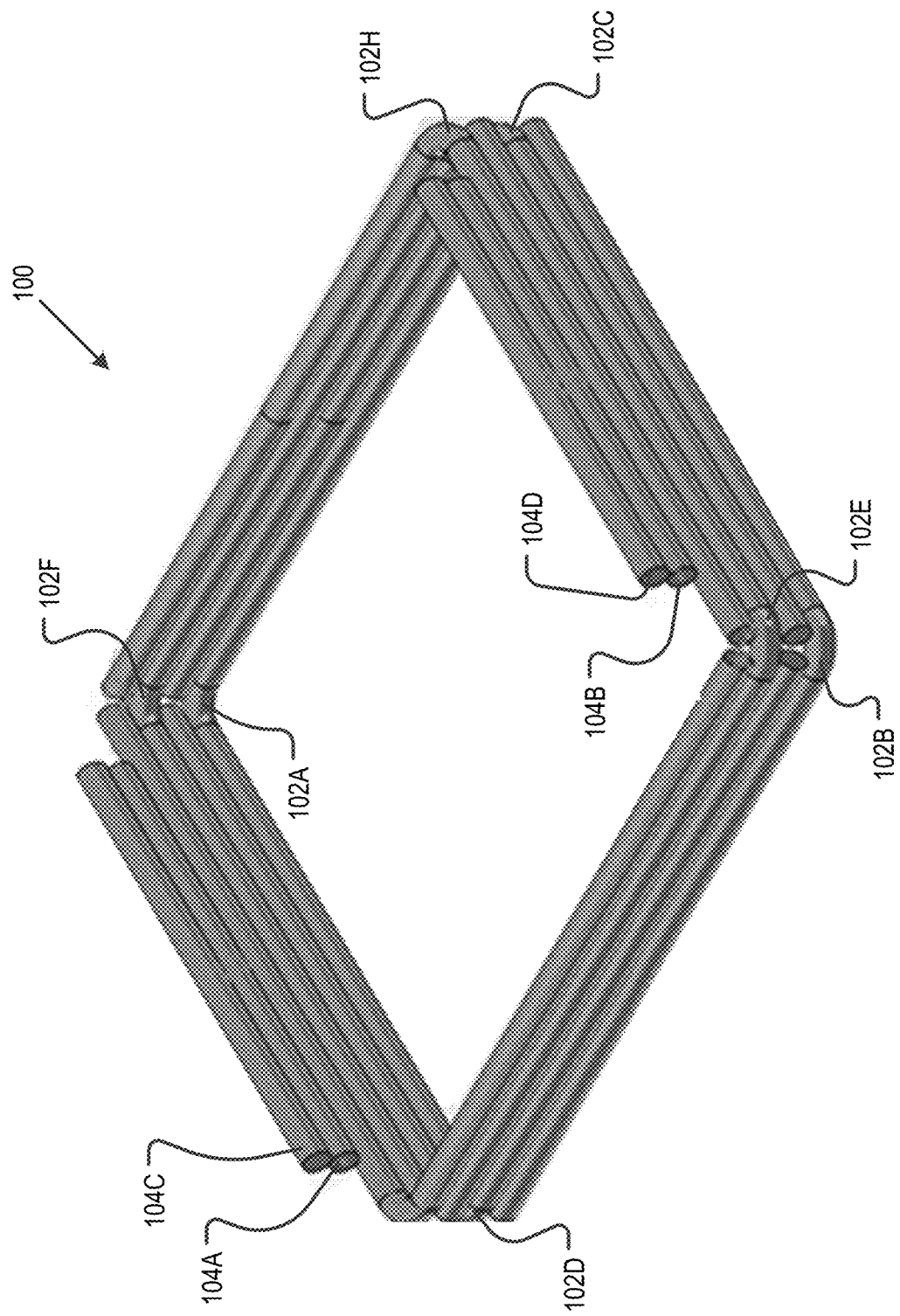
FIG. 1 depicts a perspective view of an embodiment of a preform charge.

Definitions. The following terms are defined for use in this description and the appended claims:

"Fiber" means an individual strand of material. A fiber has a length that is much greater than its diameter. For use herein, fibers are classified as (i) continuous or (ii) short. Continuous fibers have a length that is about equal to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold. The term "short fiber," as used herein, is distinct from the "chopped fiber" or "cut fiber," as those terms are typically used in the art. In the context of the present disclosure, continuous fiber and/or short fiber is present in a preform and, as such, will have a defined orientation in the preform, the mold, and the final part. As used generally in the art, chopped or cut fiber has a random orientation in a mold and the final part. Additionally, as used herein, the length of "short fiber" will be based on the length of the smaller features of a mold (they will be comparable in length). In contrast, the length of chopped or cut fiber typically bears no predefined relationship to the length of any feature of a mold/part.

"Tow" means a bundle of fibers (i.e., fiber bundle), and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" means a fiber bundle (i.e., a tow) that is impregnated with resin.

"Preform" means a segment of a continuous resin-infused fiber bundle (e.g., towpreg, the output from a pultrusion line, etc.), wherein the segment has a desired length and shape. The cross section of the fiber bundle has an aspect ratio (width:thickness) of between about 0.25 to about 6. The term "preform" explicitly excludes sized/shaped (i) tape (which typically has an aspect ratio—cross section, as above—of between about 10 to about 30), (ii) sheets of fiber, and (iii) laminates.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of preforms that are at least loosely bound together ("tacked") so as to maintain their position relative to one another. Preform charges can contain fiber in form factors in addition to fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas a compression-molding process is typically conducted at about 1000 psi (which will typically be the destination for a preform-charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

The term "docking station" is used herein to refer, collectively, to any and all features at the compression-molding facility that are involved in the removal of preform charges from a preform-charge cartridge.

"About" or "Substantially" means +/−20% with respect to a stated figure or nominal value.

Additional definitions may appear in context throughout this specification.

Unless otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

Preform Charge. FIG. 1 depicts preform charge 100, as may be stored and transported by a preform charge cartridge in accordance with the present teachings. The shape/configuration of the preform charge, with fibers aligned to achieved desired properties of a final part, facilitates molding a final part, such as via compression molding.

Preform charge 100 is an assemblage of constituents which, in this embodiment, are plural preforms that have been tacked together. Because the preforms in preform charge 100 are tacked together, they will not move relative to one another during transport, such as to a molding facility.

The preforms in preform charge 100 are segments created from a long length of resin-infused fiber bundle, such as a spool of towpreg or the output from a pultrusion line. These segments have been cut to a desired length, and, for most of the preforms in preform charge 100, shaped (bent) as well. In particular, preforms 102A through 102H all include one 90° bend.

The preforms, like the fiber bundle from which they are sourced, include thousands of individual fibers, typically in multiples of one thousand (e.g., 1 k, 10 k, 24 k, etc.). Although the preforms in preform charge 100 are cylindrical (i.e., have a circular cross section), they can have any suitable cross-sectional shape (e.g., oval, trilobal, polygonal, etc.).

The individual fibers in the fiber bundles can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Furthermore, carbon nanotubes can be used.

Any resin—thermoplastic or thermoset—that bonds to itself under heat and/or pressure can be used in the fiber bundles. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

It is notable that in embodiments in which the resin used is a thermoplastic, the preforms are tacked together by abutting them to one another (under minimal pressure) and heating them until they soften, followed by cooling. The temperature to which the bundles are heated is a function of the resin being used; it is within the capabilities of those skilled in the art to select a temperature for tacking as a function of resin type. Pre-cured thermosets, on the other hand, are tacky without heating. Thus, in embodiments in which the resin is a thermoset, fiber bundles can be pressed together with enough force to cause them to stick to one another, without heating.

Preform charge 100 comprises a plurality of preforms, each preform having the same composition as all other preforms (i.e., the same fiber type, fiber fraction, and resin type). However, in some other embodiments, some of the preforms in a single preform charge can differ from one another. It is preferable to have the resin be the same for all preforms in a preform charge, but this is not necessary as long as the different resins are "compatible;" that is, as long as they bond to one another. A preform charge can also include inserts that are not fiber based.

Preform charge 100 has a quadrilateral configuration that includes six layers of preforms. Beginning at the bottom of the structure, each of first four layers of the preform charge consists of two bent preforms. Each bent preform includes a ninety-degree bend such that the two preforms of the layer can be arranged to form a loop. Thus, the first layer of bent preforms includes preforms 102A and 102B. The next layer includes preforms 102C and 102D, followed by a third layer that includes preforms 102E and 102F. The final loop includes preforms 102G and 102H.

Within each layer of bent preforms, there will be two gaps, which are located where the two ends of one of the preforms meet the two ends of the other preform. In the illustrative embodiment, the preforms are assembled such that, in successive layers, the location of the bends (and gaps) alternate. This prevents all the gaps from aligning, which is likely to compromise the structural integrity of preform charge 100.

Above the "loop" layers are two layers of straight preforms. Each layer of straight preforms includes two preforms that are parallel to one another and positioned at opposite sides of preform charge 100. Thus, the first layer of straight preforms includes preforms 104A and 104B, and the second layer of straight preforms consists of preforms 104C and 104D.

There are several ways to fabricate a preform charge, such as preform charge 100. Published Patent Application US2020/0114596 depicts (see, e.g., FIGS. 11, 13, 16, 18, and 21) the use of an appropriately shaped cavity, clamps, and an energy source as a tool for creating a preform charge. The shape of the cavity situates the constituents (e.g., performs, etc.) in the desired orientation. Preforms are placed in the cavity by hand or via a robot. Clamps are used, as necessary, to stabilize the constituents prior to tacking. An energy source is then used to join the thermoplastic-based preforms to one another. In such embodiments, the preform-charge fixture is somewhat analogous to a "mold."

Another approach for fabricating a preform charge involves the use of precisely positioned "cleats" and clamps that serve to position and stabilize the preforms as the various layers of the preform charge are formed. Energy is applied (either as each layer is created or after all layers have been formed) to tack the various layers together, thereby creating the preform charge. See, for example, U.S. patent application Ser. No. 16/877,236.

It will be appreciated that preform charge 100, with its four rectangular layers, etc., is simply one embodiment of a preform charge. The size and shape of a preform charge is dependent on the configuration of the part that is to be formed therefrom. Hence, preform charges can and will necessarily vary in size and shape. And ultimately, the particular shape and size of a preform charge will dictate the structure of preform charge cartridge that will accommodate same for storage and transport.

Figure 2:
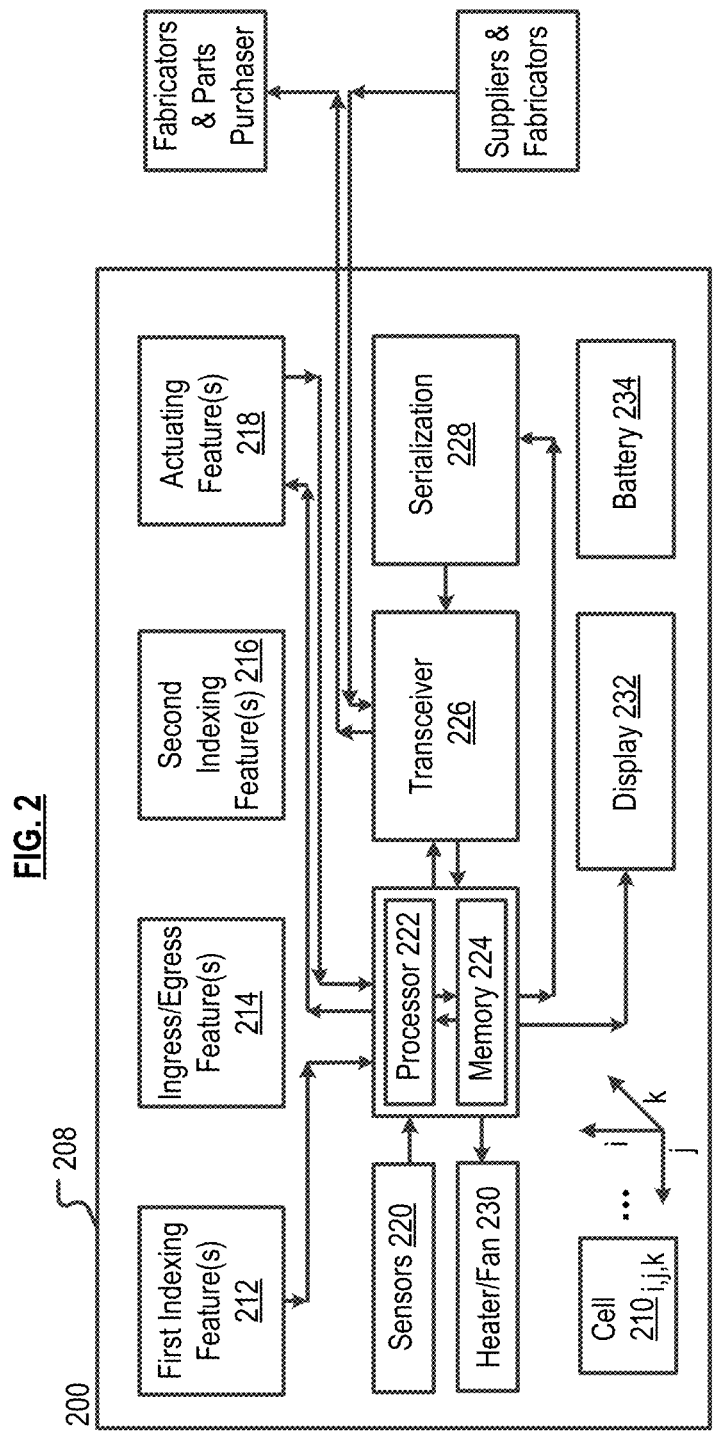
FIG. 2 depicts a block diagram of an illustrative embodiment of a preform charge cartridge in accordance with the present invention.

Preform Charge Cartridge. FIG. 2 depicts a block diagram of preform charge cartridge 200 in accordance with the illustrative embodiment of the invention. Many of the features represented by the various blocks are optional. In other words, some embodiments of a preform charge cartridge in accordance with the present teachings will include less than all of the features/blocks depicted in FIG. 2.

Preform charge cartridge 200 includes a plurality of cells $210_{i,j,k}$ i=1,x; j=1,y; and k=1,z, (generically "cell 210"). In some embodiments, each cell 210 receives a single preform charge, such a preform charge 100. In some embodiments, preform charge cartridge 200 consists of a single 2D array of cells 210.

Figure 7:
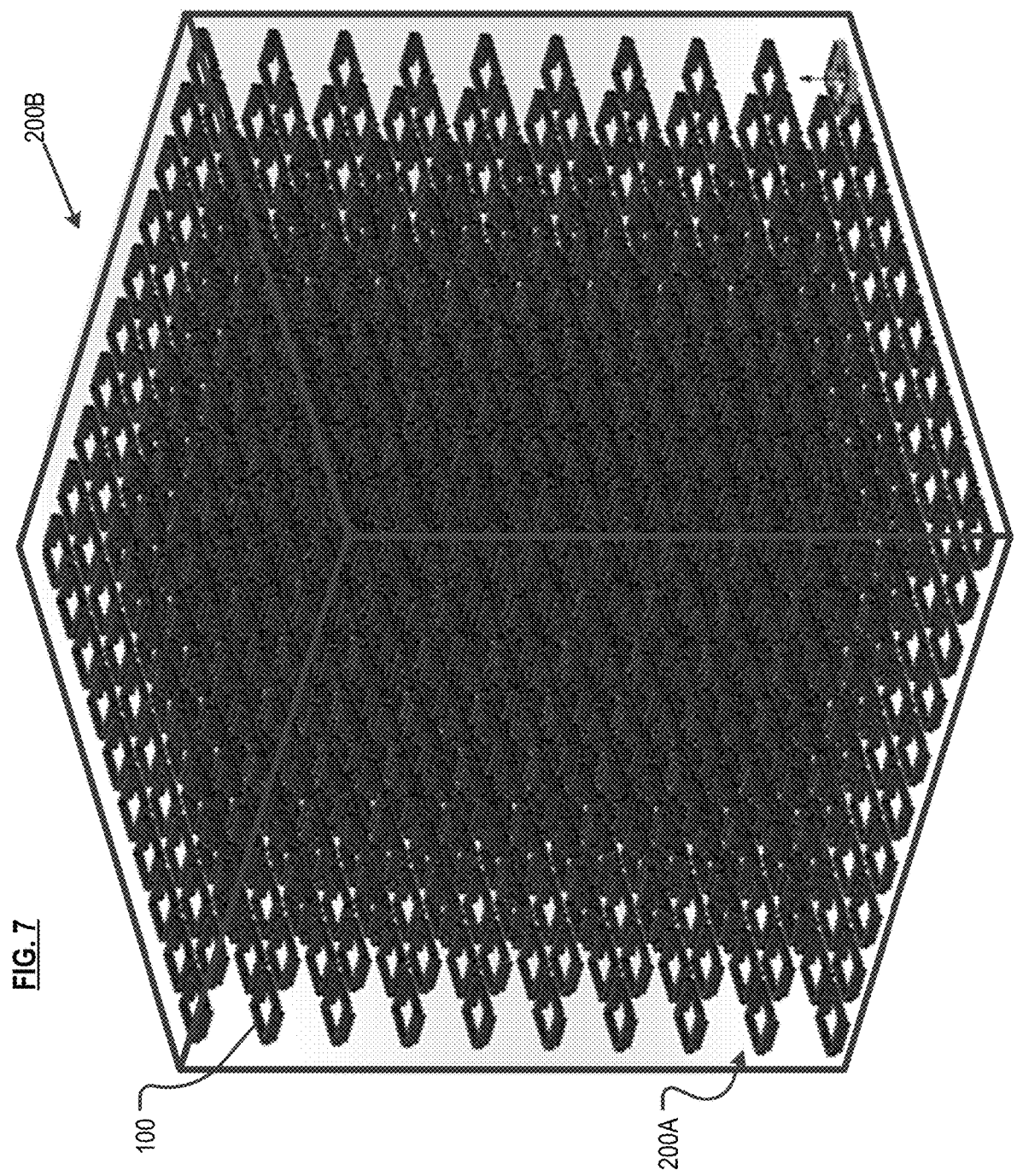
FIG. 7 depicts a second embodiment of the preform charge cartridge of FIG. 3.

In some other embodiments, preform-charge cartridge 200 includes multiple, stacked 2D arrays of cells 210 (see, e.g., FIG. 7).

In some embodiments, preform charge cartridge 200 also includes removable cover 211 (shown in partial section), which covers each cell 210. The cover may be a unitary piece of material, such that removal of the cover exposes the interior of all cells 210 in the cartridge. In some embodiments, the cover is segmented, such that removal exposes a particular row or column of cells 210. In embodiments in which cartridge 200 comprises multiple stacked 2D arrays of cell as in FIG. 7, the bottom of an overlying 2D cartridge can serve as the top for a 2D cartridge disposed directly beneath it.

Each cell 210 is physically adapted to receive a preform charge in a particular orientation and to ensure that the preform charge maintains that orientation. In some embodiments, the physical adaptation is a retainer that has a shape and a size that are substantially the same as the shape and size of the preform charge. As a consequence, the preform charge is restrained from moving, assuring that the position and orientation of the preform charge within cell 210 is as desired and is substantially invariant during transport. Consider that preform charge 100 may be required to be in a specific orientation and position within each cell 210 of cartridge 200 to be reliably grasped by a robot at the compression-molding facility's docking station. Moreover, this helps to ensure that when the preform charge is ultimately placed in a mold, its fiber alignment will be as desired. It is notable that restricting the movement of the preform charge in this manner helps to maintain its physical integrity during transport.

Cells 210 are described in further detail in conjunction with FIGS. 3 through 6.

Preform charge cartridge 200 further includes first indexing features 212, ingress/egress features 214, second indexing features 216, and actuating features 218. It will be understood by those skilled in the art that the presence of any one or more of features 212, 214, 216, and 218 in any particular preform charge cartridge 200, and the specific structural configuration of such features, may be dictated to at least some extent by the configuration and operation of the equipment at the compression-molding facility. For example, in some embodiments, the compression-molding facility has semi/fully automated equipment that is involved in the removal of preform charges from cartridge 200. For example, a robotic arm at the compression-molding facility may remove the preform charges and place them in a compression mold. In some other embodiments, the compression-molding facility is passively involved in the charge-removal process, providing little more than registration features that position cartridge 200 in an appropriate position with respect to the compression molding equipment. Features 212, 214, 216, and 218 of cartridge 200 are described briefly below and then in further detail in conjunction with FIGS. 3-6.

First indexing features 212 addresses the association of a particular preform charge to a particular cell 210. Consider, for example, an embodiment in which preform charge cartridge 200 includes more than one type of preform charge. In such embodiments, information pertaining to the location (i.e., cell 210) of each type of preform charge in cartridge 200 must be ascertainable, so that the docking station can reliably retrieve an appropriate preform charge for placement in a particular mold, or portion of a mold.

In some embodiments, first indexing features 212 includes a cell designation. The cell designation comprises, at a minimum, a preform-charge identifier and a cell identifier. The preform-charge identifier is a designation, known to both the supplier of the preform charge and the compression-molding facility, which provides sufficient identifying information about the preform charge (e.g., configuration, size, etc.). The cell identifier is a designation that unambiguously and uniquely defines a cell. For example, the cell identifier could be the x, y or x, y, z coordinates of the cell in a 2D or 3D array, respectively.

As used herein and in the appended claims the term "associate" and its inflected forms means that some type of relationship exists or is otherwise contemplated between the associated items, wherein the association is discernable through some means. For example, if a particular preform charge is "associated" with a particular cell, it means that there is some connection between that preform charge and that cell, which connection can be discerned, such as through labeling, a look-up table, an observable spatial relationship (being co-located), or in any other fashion as will occur to those skilled in the art.

In some embodiments, the cell-designation information can be stored in memory 224 via processor 222. In some other embodiments, the cell-designation information can be stored as a visual representation of machine-readable data, such as a bar code or QR code affixed to the outside of cartridge 210. If the information is stored in memory 224, it is accessed at the compression-molding facility either by wired connection or wirelessly via transceiver 226. If the location information is stored as a visual representation of machine-readable code, the information is extracted at the compression-molding facility via an appropriate reader. The cell-designation information and/or its mode of storage (data base in processor-accessible memory, bar code, QR code, etc.) are all considered to be elements of first indexing feature 212.

With respect to ingress/egress features 214, each preform charge must be loaded into cell 210 of cartridge 200, and must be removed therefrom. In some embodiments, ingress/egress feature 214 is the aforementioned retainer, the shape of which facilitates ingress of the preform charge. In some embodiments, egress of a preform charge from cell 210 to a mold cavity is also facilitated by the shape of the retainer. Alternatively, or in addition, ingress/egress feature 214 can be deployable chutes/slides, that are used to guide preforms into a mold cavity at a molding facility. In some further embodiments, ingress/egress feature 214 is additionally or alternatively comprises retractable plates that, when engaged to cell 210, form the bottom thereof, and, when retracted, release a preform charge from a cell. Additionally, a pushing mechanism for pushing a preform charge out of cell 210 is a further example of an egress feature 214.

Second indexing features 216 are used to ensure correct positioning of preform-charge cartridge 200 with respect to the docking station. Second indexing features 216 are typically passive features of cartridge 200, such as pins, slots, etc., which engage complementary mating features of the docking station.

Actuating features 218 are used to initiate actions when cartridge 200 and docking station engage one another. Such actions can be, for example, deployment of a slide (not depicted) for transferring preform charges to a mold cavity, retraction of a bottom plate (not depicted) of each cell, deployment of a pushing mechanism (not depicted) that pushes the preform charges out of the cartridge and into the mold cavity, etc. Furthermore, actuation features 218 can be used to initiate information transfer, such as transmitting cell-designation information.

As appropriate, actuation features 218 can be passive or active. For example, movement of physical elements (e.g., slides, plates, pushing mechanism) can be actuated passively, via an arm, etc., wherein engagement of cartridge 200 to the docking station causes the arm to move, etc., which in turn initiates deployment, for example, of the aforementioned egress features 214. Alternatively, actuation can be active, wherein engagement of cartridge 200 to the docking station completes a circuit that conveys a signal (voltage) to processor 222. The processor then triggers the appropriate physical response of the cartridge (e.g., deployment of egress features 214, etc.).

The source of power for the actuation features can be mechanical (e.g., the weight of cartridge 200 moving an arm when the cartridge engages equipment at the docking station, a spring, etc.), electrical, electromechanical, electromagnetic, or pneumatic. And any action following the deployment (e.g., pushing the preforms into the mold cavity, etc.) can be performed mechanically, electrically, electromechanically, electromagnetically, or pneumatically.

In some embodiments, cartridge 200 includes one or more sensors 220. The sensors are used to monitor the condition of preform charges 100, and/or provide information that used for serialization purposes. For example, cartridge 200 includes one or more of the following sensors, among any others:

hygrometer;
timer;
camera;

weigh scale;
accelerometer; and
temperature measuring element.

It is important for the preform charges to remain dry to avoid creating porosity in the part ultimately being produced. A hygrometer can be used to monitor the humidity in preform charge cartridge 200. If humidity exceeds a predetermined level, heater and fan 230 are activated to drive moisture from the preform charges and evacuate the now moisture-containing air from cartridge 200.

A timer can be used to monitor the amount of time that preform charge cartridge 200 has been exposed to ambient environment. One or more cameras can be used to verify the size/shape of each preform charge loaded into and withdrawn from cartridge 200. A weigh scale is used to quantify the number of preform charges that are loaded into preform charge cartridge 200.

An accelerometer can be used to monitor the handling of cartridge 200 during transport, to identify, for example, high-g events, etc., such as the cartridge falling to the ground or being jostled. Such events can be recorded, along with the time of the event (via the timer). A temperature-measuring element, either mechanical based (i.e., bimetallic, gas or liquid) or electronic based (e.g., resistance temperature detector or thermocouple, etc.) can be used. The temperature-measuring element can be used in conjunction with heater/fan 230 when driving humidity from cartridge 200.

The sensors discussed above can also be used in conjunction with serialization 228, as described in further detail later in this specification. Information stored in memory 224, in RFID tags, or other serialization in the preform charge cartridge can be referenced to track material from supplier to manufacturer, and can be interfaced with upstream and downstream processes.

In some embodiments, preform charge cartridge 200 includes a device for presenting information about the preform charges in visual form, such as a display, LED, or other visual signaling devices (collectively "display 232"). The information presented by display 232 can be, for example and without limitation, an indication whether all preform charges meet required specifications, or not, the identify of those that do not meet specifications, whether the preform charges are dry or wet, the number of loaded preforms, and the like.

In some embodiments, cartridge 200 includes processor 222, memory 224, and transceiver 226. Among other tasks, processor 222 receives and processes information from sensors 220, stores information (e.g., for serialization, etc.) in memory 224, generates control signals for heater/fan 230 and actuating features 218, as appropriate, controls display 232 and controls transceiver 226. Transceiver 226 receives information from suppliers/fabricators regarding raw materials and the preform charges, and transmits information to fabricators and the end user regarding same.

In some embodiments, preform charge cartridge 200 includes battery 234 to power any on-board electrical consumers (e.g., actuating features 218, sensors 220, heater/fan 230, processor 222, memory 224, transceiver 226, display 232, etc.). In some alternative embodiments in which cartridge 200 does not require power during transit, power can be provided by an external system, such as the docking facility at the compression molding facility.

Most of the elements of preform charge cartridge 200 are contained within housing 208, the housing being of sufficient size and having a suitable shape for accommodating them. Some elements, such as display 232, some of sensors 220, and some elements pertaining to serialization 228, may reside on the exterior of housing 208, or interface with the exterior, such as fan 230, or some of sensors 220.

Figure 3:
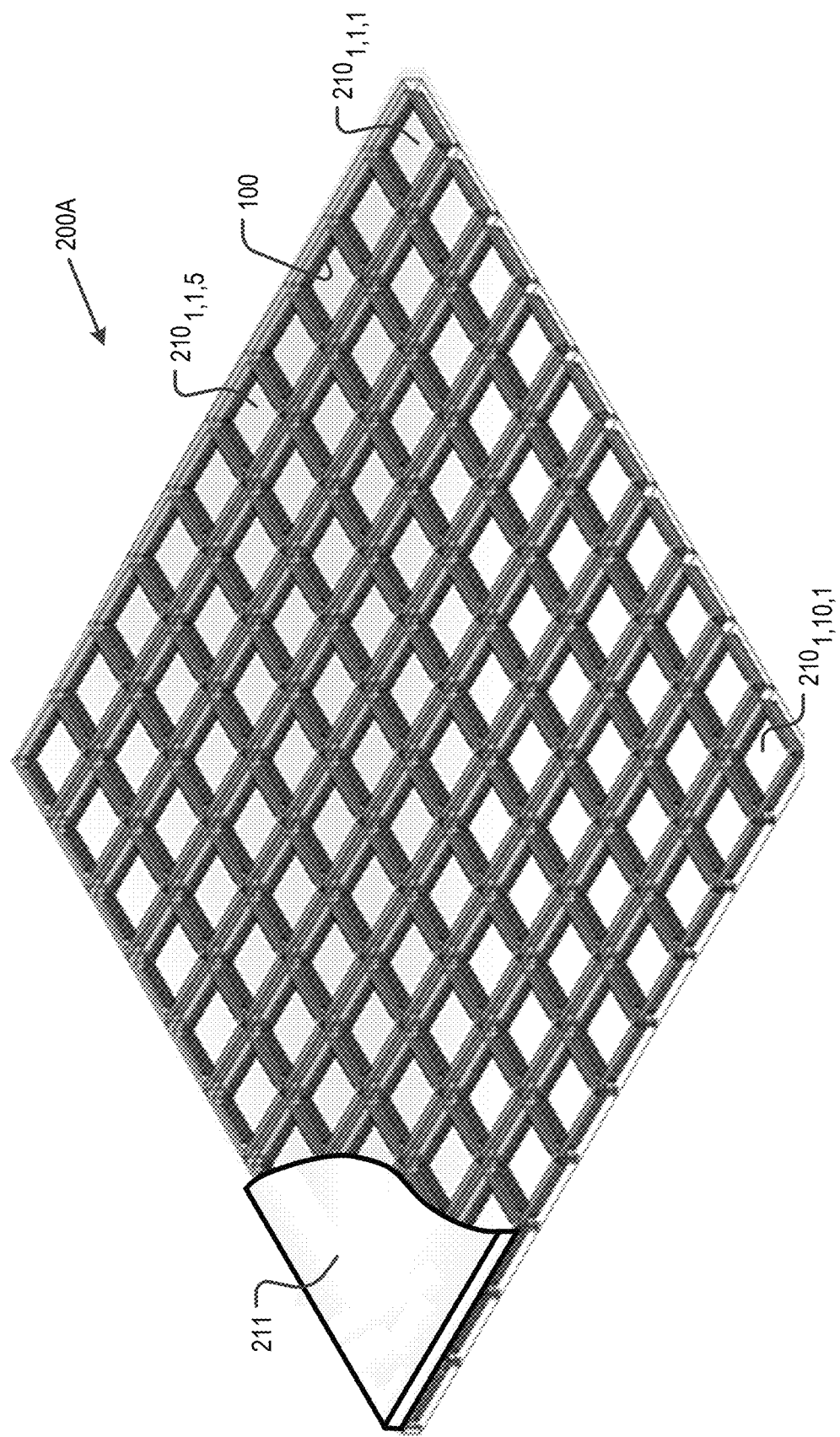
FIG. 3 depicts a first embodiment of the preform charge cartridge of FIG. 2, showing preform charges stowed therein.

FIG. 3 depicts cells 210 of 2D preform charge cartridge 200A, which is a specific embodiment of cartridge 200 of FIG. 2. For clarity of illustration, other elements depicted in cartridge 200 are not shown in cartridge 200A; however, one or more of such other elements will be present.

In the illustrative embodiment depicted in FIG. 3, preform charge cartridge 200A accommodates one hundred preform charges in one hundred cells organized in a 2D, 10×10, array. Preform charges 100 are depicted in each cell of preform charge cartridge 200A. A few exemplary cells 210 are identified: cell $210_{1,1,1}$; cell $210_{1,10,1}$; and cell $210_{1,1,5}$. Since cartridge 200A comprises a single 2D array of cells, the value of the index "i" for all cells $210_{i,j,k}$ is "1".

In the illustrative embodiments, cells 210 are square; however, in other embodiments, the cells can have a different shape, including the shape of other quadrilaterals, other polygonal shapes, and also non-polygonal shapes. Furthermore, the array itself is square; in some other embodiments, the array has a different 2D aspect ratio, including other quadrilateral shapes, other polygonal shapes, and non-polygonal shapes. Furthermore, although preform-charge cartridge 200A accommodates 100 preform charges, in other embodiments, a preform-charge cartridge can accommodate more or less than 100 preform charges.

Figure 4:
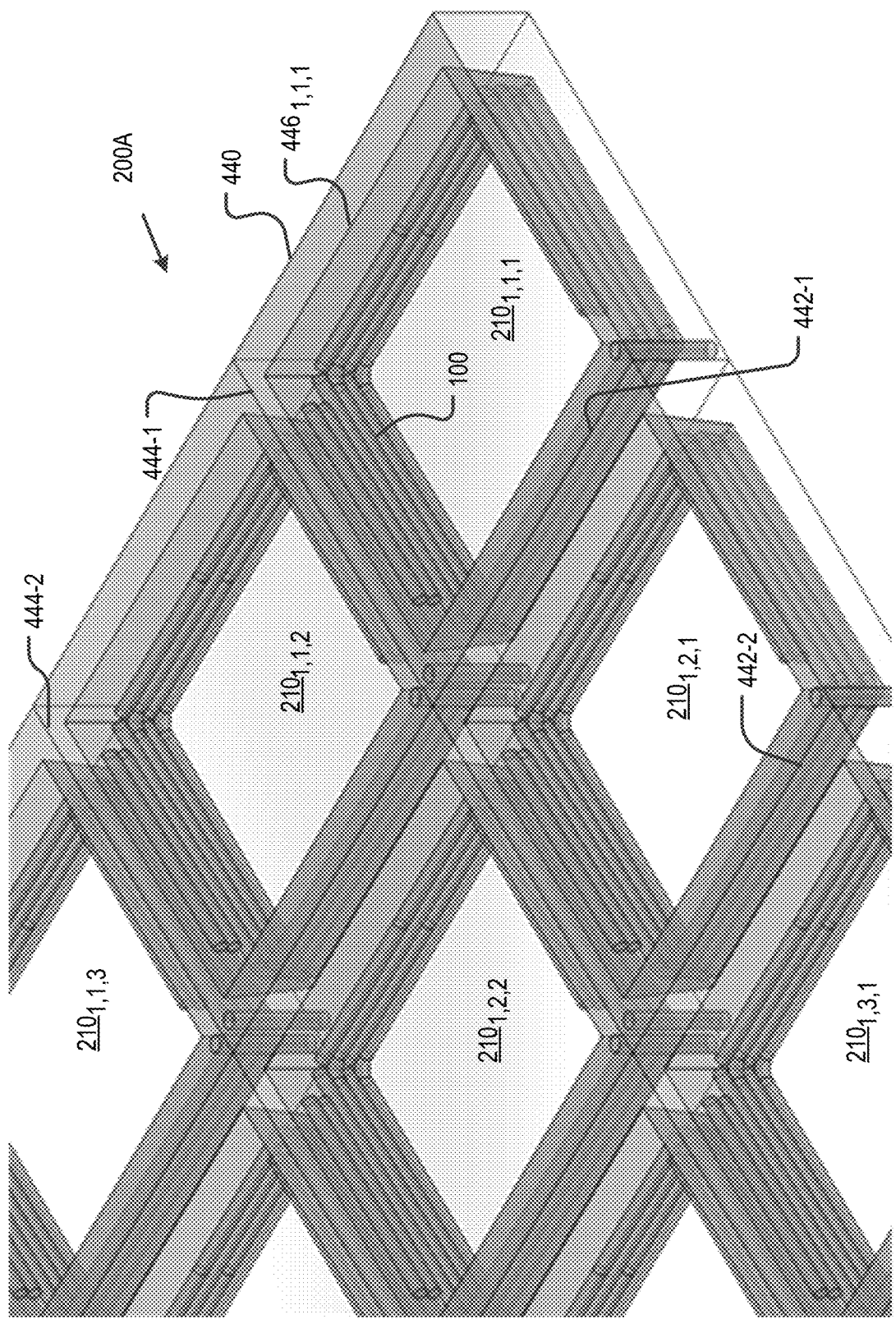
FIG. 4 depicts an enlargement of a portion of the preform charge cartridge of FIG. 3.

FIG. 4 depicts an enlarged view of a portion of preform charge cartridge 200A. The cartridge includes a plurality of individual cells 210, each of which retains one preform charge 100. Preform charge cartridge 200A includes outer wall 440, which in the illustrative embodiment has the form of a quadrilateral (e.g., square, rectangle, etc.) Preform charge cartridge 200A also includes a first plurality of internal partition walls 442-$i$, $i=1,9$, and a second plurality of internal partition walls 444-$j$, $j=1,9$. The first and second partition walls are arranged orthogonally with respect to each other. Each such partition wall extends between opposite sides of four-sided outer wall 440. The partition walls thus segment the internal volume of the preform charge cartridge 200A into the aforementioned plurality of cells 210. Within each cell 210, such as cell $210_{1,1,1}$, is retainer $446_{i,j,k}$ $i=1$, $j=1,10$, $k=1,10$ (generically "retainer 446"). It will be clear to those skilled in the art, in light of this specification, that the specific values and ranges for the indices i, j, and k provided above pertain to cartridge 200A, wherein, in the illustrative embodiment, the cartridge comprises a 10×10 array of cells. In other embodiments having a different sized array, the ranges/values for these indices will be different.

Figure 5:
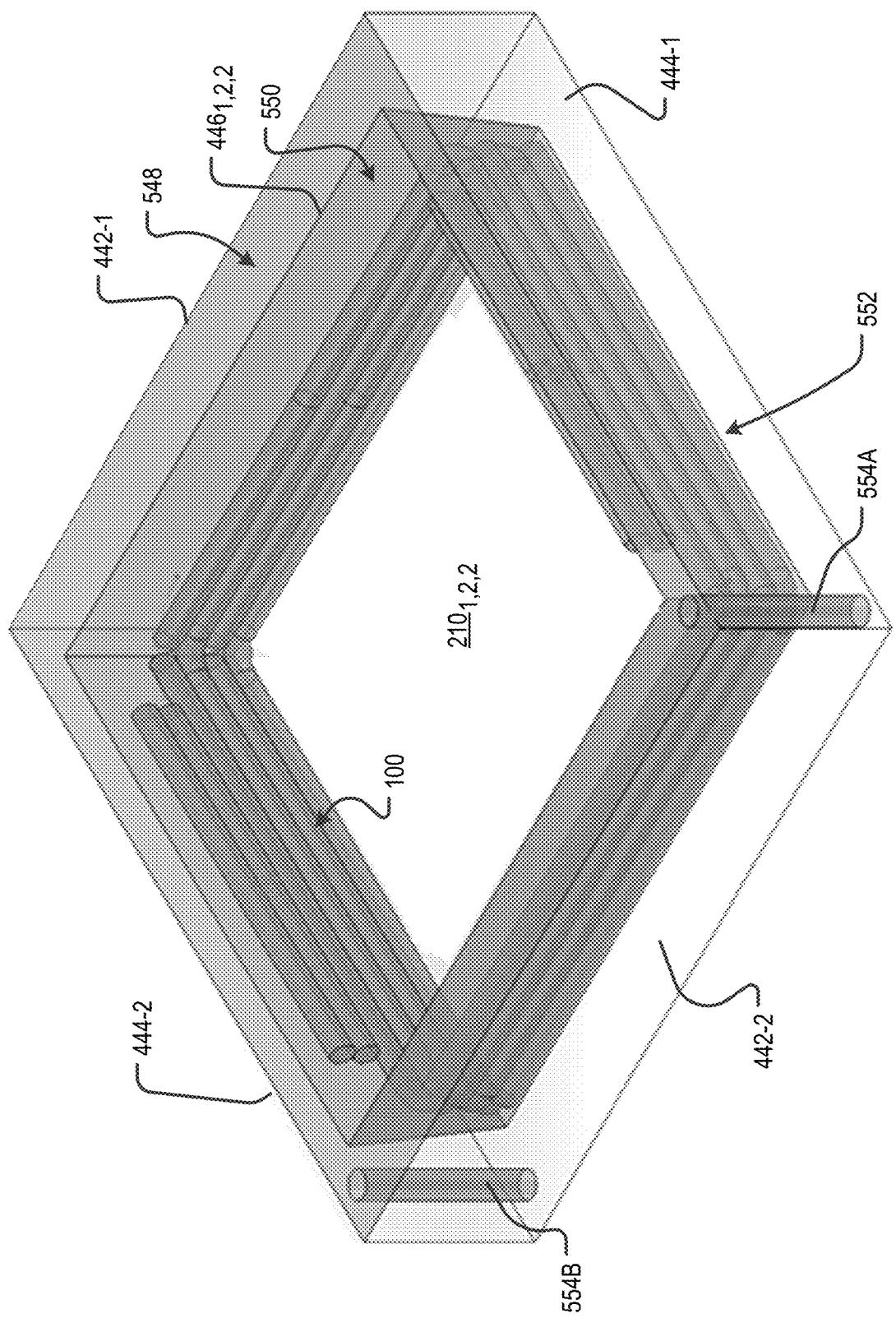
FIG. 5 depicts a single cell of the preform charge cartridge of FIG. 3.

FIG. 5 depicts exemplary cell $210_{1,2,2}$ of cartridge 200A, showing retainer $446_{1,2,2}$ separated by gap 548 from partition walls 442-1, 442-2, 444-1, and 444-2. In the illustrative embodiment, each retainer 446 receives and retains one instance of preform charge 100, and each retainer is advantageously shaped and sized for the specific configuration of the preform charge it is intended to receive. Since, in the illustrative embodiment, preform charge 100 has a rectangular or square shape of a specific size, retainer 446, represented in FIG. 5 by retainer $446_{1,2,2}$, also has a rectangular shape that is of very similar size to preform charge 100.

Although the retainer could have a "generic" shape and a size large enough to accommodate any number of different shaped preform charges, the retainer would not be able to provide several important functions, including an inability to:

(i) maintain the shape of each individual preform charge;

(ii) ensure that individual preforms of a preform charge do not separate from one another;
(iii) maintain the position of each preform charge relative to other preform charges being transported; and
(iv) maintain the position of each preform charge relative to the cartridge.

With respect to items (1) and (ii), if not properly secured for transport, such as by a close fit between retainer 446 and the received preform charge, the preform charge might be damaged (e.g., detachment of any one or more of the individual preforms that compose the preform charge, etc.).

With respect to items (iii) and (iv), consider that preform charges can be transferred to a mold at the compression-molding facility:
- one at a time, into one region of a single mold cavity,
- more than one at a time into multiple regions of a single mold cavity,
- more than one at a time into one region of plural mold cavities, or
- more than one at a time into multiple regions of plural mold cavities.

Retainer 446 is thus an example of an element of cell 210 that is physically adapted to receive a preform charge in a particular orientation and to ensure that the preform charge maintains that orientation. Regardless of the nature of the transfer, it will be appreciated that if the preform charge is not restrained in a predetermined and desired orientation/position, a pick-and-place tool, such as may be used to remove the preform charge for insertion into a mold cavity, may not reliably find/engage the preform charge. And if plural preform charges are dispensed at the same time, they may wind up in undesired locations with respect to one another and/or with respect to the mold cavity itself. Among other problems, this may result in an undesirable fiber alignment within the mold cavity. It is notable that any cover (e.g., cover 211 of FIG. 2) that covers the cell/retainer during transit will be configured to ensure that it does not in any way hamper egress of preform charges from the cartridge.

Figure 6:
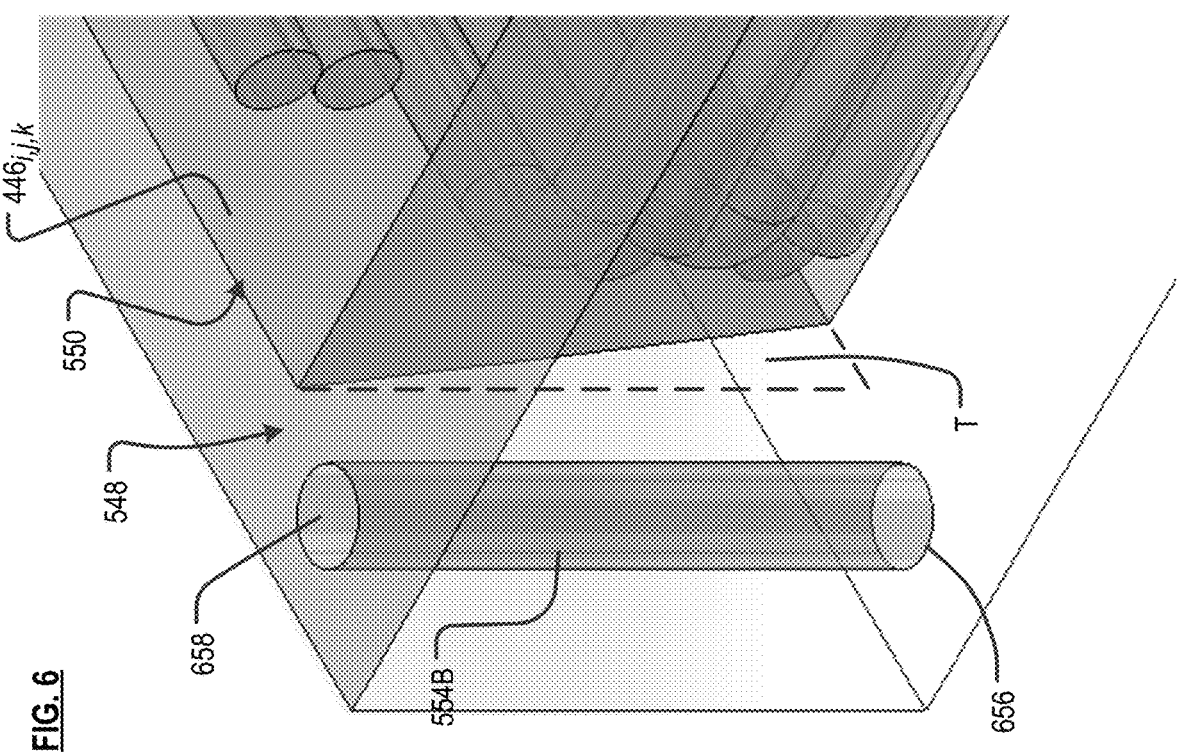
FIG. 6 depicts a portion of a single cell of the preform charge cartridge of FIG. 3.

Referring now to FIGS. 5 and 6, in the illustrative embodiment, access to each cell 210 is via opening 550 at the top of retainer 446. Thus, in the embodiment depicted, preform charges are added to or removed from each cell through opening 550. In general, the inlet and outlet for the preform charge may be in the same plane, as here, depending on the indexing of the preform charge cartridge. Also, as here, that opening may provide both ingress and egress. In some other embodiments, the inlet and outlet may be in different planes, or, if in the same plane, may have different inlet and outlet openings.

In the embodiment depicted in FIG. 6, retainer 446 tapers from top to bottom. Taper T serves several purposes. Since, in the illustrative embodiment, ingress to and egress from each cell 210 is at the top of retainer 446, the perimeter of the top of the retainer (i.e., at opening 550) is advantageously large enough to facilitate ingress and egress. Yet, as previously described, a close fit between the retainer and the preform charge is desirable to prevent movement of the preform charge during transit and to ensure precise localization of the preform charge.

The inventors recognized that this could be achieved by making the perimeter of retainer 446 somewhat larger than the preform charge near the top of the retainer and somewhat smaller than that (i.e., just slightly larger than the perimeter of the preform charge) near the bottom of the retainer. In the illustrative embodiment, for example, there is about 3 millimeters of clearance between the perimeter of top of the retainer and the perimeter of the preform charge, and about 1 millimeter of clearance between the perimeter of the bottom of the retainer and the perimeter of the preform charge.

Taper T thus facilitates ingress and egress, while also ensuring that the preform charge will be substantially immobilized within the retainer (near the bottom), guaranteeing minimal destruction-causing movement and reliable positioning. Also, in embodiments in which egress is from the bottom of retainer 446, the taper helps guide the preform charge into, for example, a mold cavity. Taper T of retainer 446 is thus a further specific example of a physical adaptation for ensuring that the cell maintains the orientation of a preform charge that it receives, as well as being an example of ingress/egress features 214.

In the illustrative embodiment, two "second" indexing features 554A and 554B (see FIG. 5) are disposed in gap 548 between retainer 446 and the surrounding partition walls. In some embodiments, these indexing features are intended to cooperate with features of a docking station at the compression-molding facility, thereby registering the preform charge cartridge to the molding process, for the reasons previously discussed. In the embodiment depicted in FIG. 6, each indexing feature has openings 656 and 658 at a respective bottom and top thereof. A pin associated with the registration system of the docking station would be received in at least one of the openings.

In some embodiments, each cell 210 (or retainer 446) within preform charge cartridge 200 is sealed from ambient moisture to keep the internal constituents from absorbing humidity. This can be accomplished, for example, by positioning a moisture-impermeable cover and gasket (not depicted) over cells 210 or retainers 446. Each cell/retainer can be individually gasketed and covered, or a single cover can be used for preform charge cartridge 200. The use of such a moisture-impermeable cover can serve as cover 211 (FIG. 2).

In some embodiments, preform charge cartridge 200 includes more than one type of preform charge. In such embodiments, the preform charge cartridge include cells/retainers having different configurations, as necessary, to accommodate any differences in configuration among the various preform charges.

FIG. 7 depicts preform charge cartridge 200B in accordance with an embodiment of the invention. Preform charge cartridge 200B includes ten copies, stacked, of preform charge cartridge 200A. Thus, preform charge cartridge 200B comprises ten layers, each layer having 100 (10×10) cells 210 and capable of receiving one hundred preform charges 100. In some embodiments, access to each 10×10 layer can be through the top of cartridge 200B, wherein layers are serially removed via a pick-and-place tool, after which the preform charges of a given layer are then deposited in a mold cavity. In some other embodiments, each layer is accessible through one of the sides of cartridge 200B, such that layers are withdrawn one-by-one through the side to have their preform charges delivered to a mold cavity, etc. As previously noted, the underside of an overlying 2D preform charge cartridge can provide a "cover" for the cells of an underlying 2D preform charge cartridge.

In some embodiments, preform charge cartridges 200 are designed for efficient transport, such as by "nesting" to one another, and designed with removable elements for stabilizing contents during transport, wherein the elements are removed after transport and prior to engagement with a molding process.

In another aspect of the invention, preform charge cartridge 200 can be used to transfer preform charges within a single manufacturing facility. For example, the cartridge can transport preform charges from their location of fabrication to a mold cavity in the same processing line. The preform charge cartridges could, for example, travel to various locations within a single facility on conveyor belts or linear rails. After depositing the preform charges in the mold cavities, the cartridge is returned to a position where it is refilled with preform charges and the process repeated.

As previously noted, embodiments of a preform charge cartridge in accordance with the present teachings may include less than all of the elements depicted in FIG. 2. More particularly, embodiments of a preform charge cartridge in accordance with the present invention will include cells 210 (any version thereof), and any one or more non-conflicting combinations of the following features:
  Housing 208;
  First indexing feature(s) 212;
  Ingress and/or egress feature(s) 214;
  Second Indexing Feature(s) 216;
  Actuating Feature(s) 218;
  Sensors 220;
  Heater and/or Fan 230;
  Processor 222, Memory 224;
  Transceiver 226;
  Serialization 228 (e.g., in the form of RFiD tags, labels, information stored in memory, etc.);
  Display 232;
  Battery 234.

In a first preferred embodiment, a preform-charge cartridge in accordance with the invention will include (in addition to housing 208 and cells 210) some form of at least ingress/egress features 214. It will be appreciated that in some embodiments, ingress/egress features 214 are implemented via the shape/configuration of cells 210, such that no additional elements are required.

In a second preferred embodiment, a preform-charge cartridge in accordance with the invention will include serialization, in addition to the elements of the first preferred embodiment. In such embodiments, the preform-charge cartridge may be accompanied, for example, by RFID tags or labelling, as discussed further below.

In the illustrative embodiments shown in FIGS. 3-7, each cell is defined by and within four partition walls 442-$i$ and 444-$j$. Within the partition walls, and spaced therefrom, is retainer 446. The shape of cell 210, and the shape of retainer 446 are identical. It is not required, however, that both have the same shape, since, in the illustrative embodiment, it is not the partition walls but rather retainer 446 that actually receives a preform charge and is responsible for substantially immobilizing it. Thus, if the shape of the retainer is not square, rectangular, etc., it may nevertheless be convenient to configure each cell 210 as a square or rectangle.

Although the additional detail provided in FIGS. 4 through 7 is directed to preform charge 200A having square or rectangular shape cells 210/retainers 446, it is within the capabilities of those skilled in the art, in conjunction with this specification, to apply the teachings of those figures to other embodiments, such as those depicted in FIGS. 11A-11F.

Figure 11C:
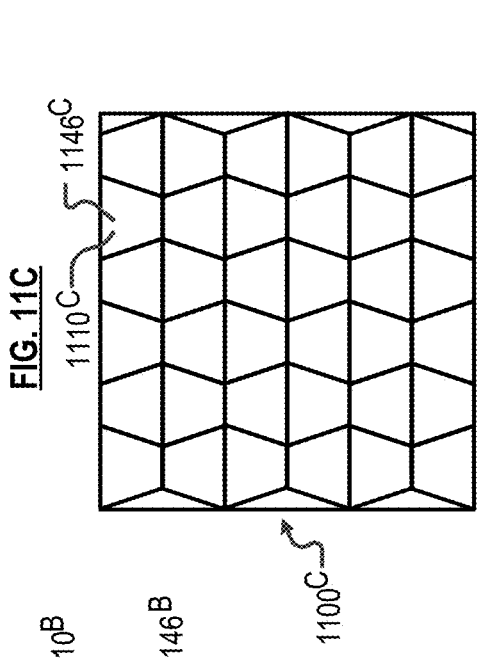
FIGS. 11A-F depict additional embodiments of preform charge cartridges in accordance with the present teachings.
Figure 11B:
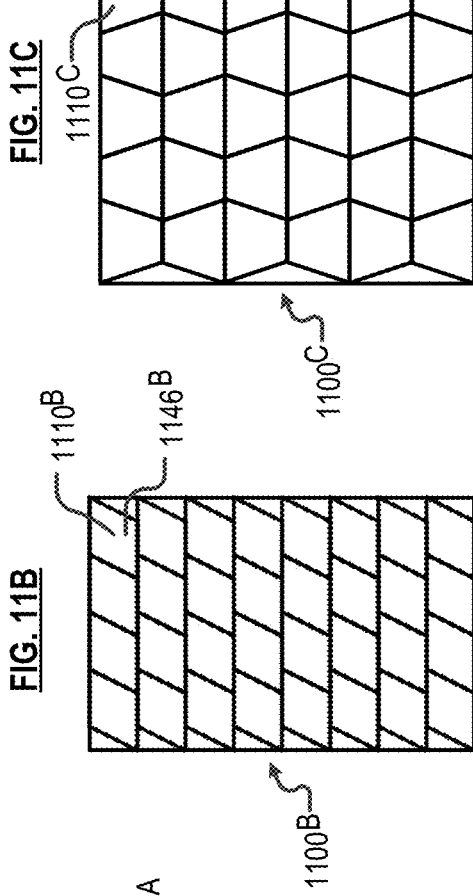
Figure 11A:
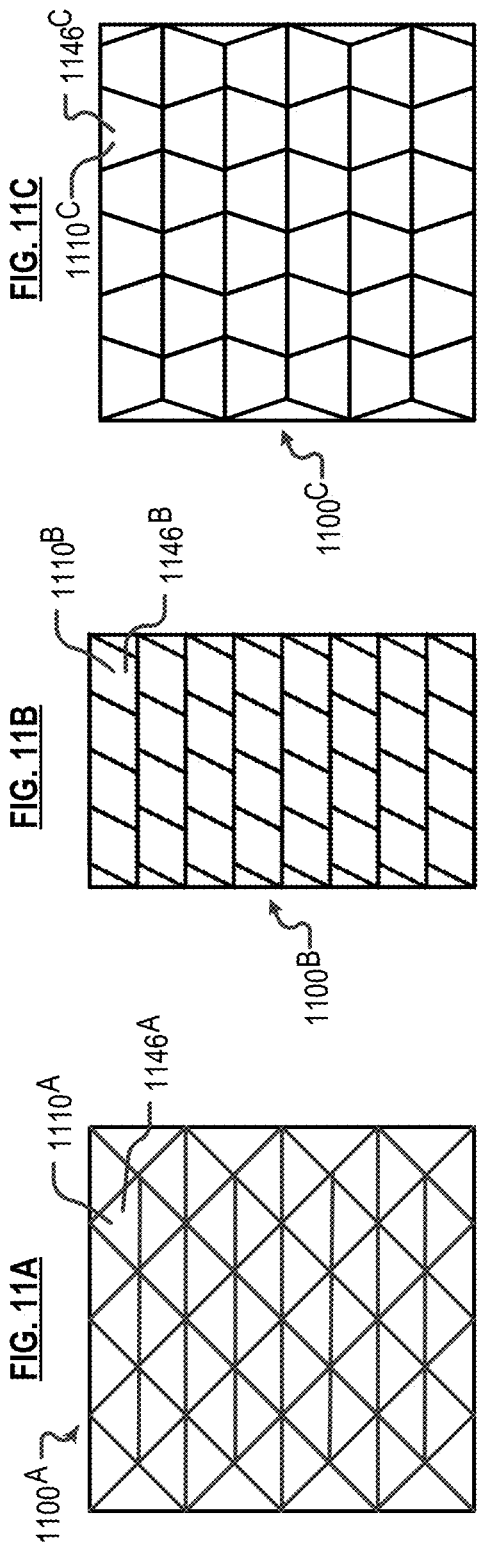
Figure 11F:
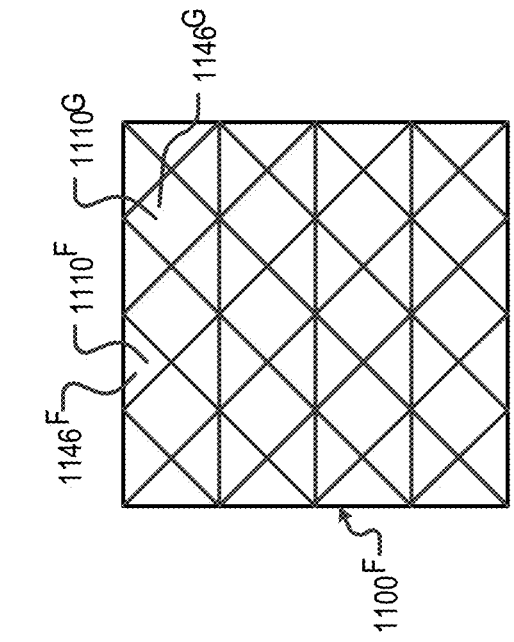
Figure 11E:
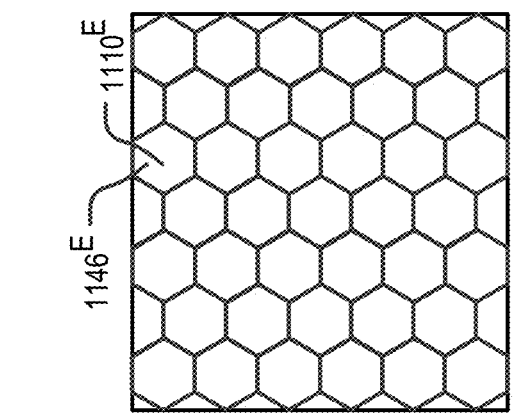
Figure 11D:
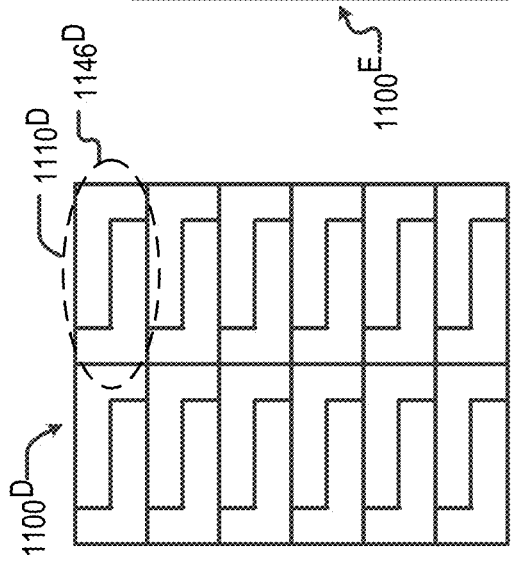

FIGS. 11A-F depict alternative embodiments of a preform-charge cartridge in accordance with the present teachings, each having cells 1110 and/or retainers 1146 that differ in shape from a square or rectangle as depicted in cartridge 200A. In particular, FIG. 11A depicts cartridge 1100A having an array of triangular-shape cells/retainers $1110^A$/$1146^A$, FIG. 11B depicts cartridge $1100^B$ having an array of rhomboid-shape cells/retainers $1110^B$/$1146^B$, and FIG. 11C depicts cartridge $1100^C$ having an array of trapezoidal-shape cells/retainers $1110^C$/$1146^C$. FIG. 11D depicts cartridge $1100^D$ having an array of six-sided polygonal cells/retainers $1110^D$/$446^D$, FIG. 11E depicts cartridge $1100^E$ having an array of hexagonal-shape cells/retainers $1110^E$/$1146^E$, and FIG. 11F depicts cartridge $1100^F$ having an array of triangular-shape cells/retainers $1110^F$/$1146^F$ and array of square cells/retainers $1110^G$/$1146^G$.

FIGS. 12A and 12B depict details of a first embodiment of preform-charge cartridge $1100^A$ of FIG. 11A for receiving triangular shape preform charges (not depicted). In FIG. 12A, cartridge $1200^A$ comprises a 2D array of triangular-shape cells $1110^A$. Two of such cells are depicted in FIG. 12B. Each cell is defined by three partition walls: one laterally extending wall 1245, and two diagonally extending walls, such as 1244-$n$ and 1242-$m$. Within each cell is retainer $1146^A$.

FIGS. 12C and 12D depict details of a second embodiment of cartridge $1100^A$ of FIG. 11A. In FIG. 12C, cartridge $1200^B$ comprises a 2D array of square-shape cells 1210, wherein each such cell has the ability to receive two identical preform charges. As depicted in FIG. 12D, each cell, which is defined by four partition walls 1242-$m$, 1242-$m$+1, 1244-$n$, and 1244-$n$+1, contains to retainers $1246^A$ and $1246^B$. It is notable that the shape of the cell—square—is different from the shape of the retainers or the preform charge to be received thereby (triangular).

Figure 13B:
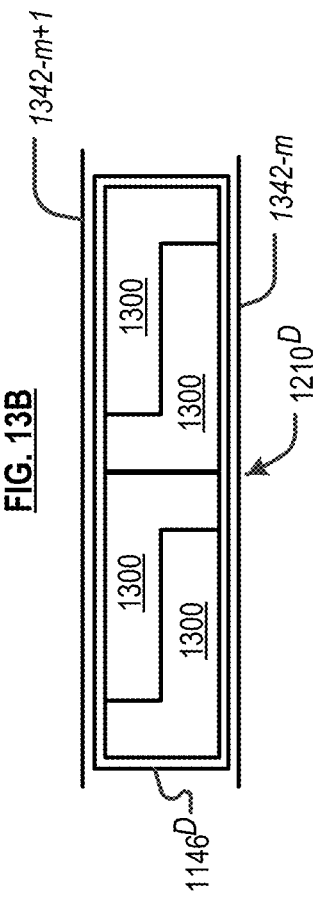
FIG. 13B depicts details of a second embodiment of preform-charge cartridge $1100^D$ of FIG. 11D.
Figure 13A:
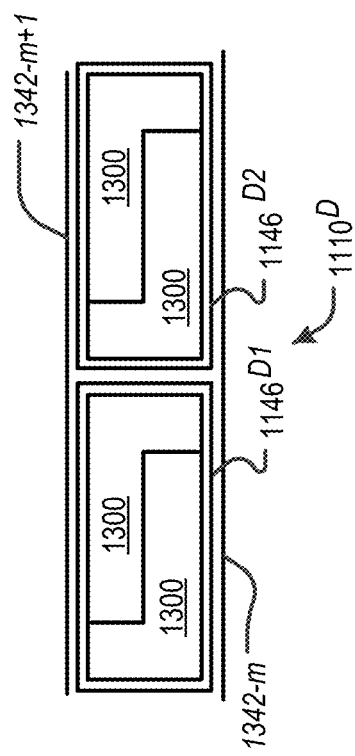
FIG. 13A depicts details of a first embodiment of preform-charge cartridge $1100^D$ of FIG. 11D.

FIG. 13A depicts details of a first embodiment of preform-charge cartridge $1100^D$ of FIG. 11D. In the embodiment depicted in FIG. 13A, each cell $1110^D$ is defined by two partition walls 1342-$m$ and 1342-$m$+1, as well as two side walls (not depicted in FIG. 13B; see FIG. 11D) which serve as the side walls for all the cells of the cartridge. Each cell includes two retainers $1146^{D1}$ and $1146^{D2}$, each of which contains two preform charges 1300. Note here that the preforms have a shape that is different from that of either cell $1110^D$ or retainers $1146^{D1}$ and $1146^{D2}$. Yet, the retainer will nevertheless be able to provide some of its basic functions, including receiving the preform charges in a defined orientation and preventing them from moving during transit of the cartridge.

FIG. 13B depicts details of a second embodiment of preform-charge cartridge $1100^D$ of FIG. 11D. In the embodiment depicted in FIG. 13B, like the embodiment of FIG. 13A, each cell is defined by two partition walls 1342-$m$ and 1342-$m$+1, as well as two side walls. However, unlike the embodiment of FIG. 13A, each cell includes a single retainer $1146^D$, which accommodates four preform charges 1300.

In some embodiments, the cells do not include a retainer; rather, the partition walls that define the cell provide the function of the retainer. In such an embodiment, some of the features normally provided by the retainer will be absent from the preform-charge cartridge.

Serialization. Some embodiments of the invention provide a serialized preform charge cartridge and associated methods. As mentioned in the background section of this specification, "serialization" is the process of collecting and digitizing information pertaining to an item, assigning an identifier to the item, and linking the identifier to the digitized information. In the context of the present invention, and as depicted in method 800, serialization is used to monitor the progression of materials, from raw material (e.g., fiber, resin, etc.) to preform/preform charge to final product.

In accordance with the present teachings, various characterizing information is captured during the fabrication of the preform charges. Specifically, and without limitation, the characterizing information includes:

characteristics of the raw materials that compose the preforms, (e.g., source of the fibers, source of resin, source of any additives, the quality of the raw materials, etc.), characteristics pertaining to the fabrication of preform charges (e.g., design specifications for the preform charge being fabricated, the time of production, ambient conditions, specific processing conditions, etc.); and characteristics of the as-fabricated preform charge (e.g., conformance to the design specification, final mass, as-fabricated performance characteristics, etc.).

In some embodiments, the aforementioned characterizing information also includes the condition of the preform-charge cartridge when the preform-charges are placed therein. The methods for acquiring such information are well known in the art and are not germane to the invention; therefore, they are not described herein, except to state that such information can be conveyed by digital communication.

Once obtained, the characterizing information is digitally encoded and suitably organized. This information must be associated with individual preform charges, creating a "Preform Charge ID." This can be accomplished in any one of a variety of ways, including, without limitation:

(i) affixing, to each preform charge, an RFID tag/chip; or (ii) generating machine-readable code, such as for optical scanning (e.g., bar code, QR code, etc.) or other interrogation methods, which is uniquely associated with each preform-charge storage location (i.e., cell 210) within the preform-charge cartridge by printing or otherwise physically reproducing such code in appropriate locations in/on the cartridge; or (iii) creating human-readable or machine-readable labels adhered to or printed on the body of preform-charge cartridge (or in the cells thereof), which are uniquely associated with each preform-charge storage location within the preform-charge cartridge; or (iv) any other suitable method, including etching.

For use herein and the appended claims, the aforementioned physical serialization elements (i.e., RFID chip, bar codes, QR codes, human- or machine-readable labels, etched information, etc.) are collectively referenced as "tags".

If the data-storage capacity of a tag is insufficient to encode the full data capture, then only an identifier of the preform, such as the preform charge's storage location, is encoded in (or printed on) the tag. In such a scenario, the data capture is stored separately, such as in a quality management system (QMS) of: the preform-charge fabricator, the compression molding facility, and/or parts purchaser, or in processor-accessible memory of the preform-charge cartridge. Otherwise, the data capture may be stored in/on the tag along with the identifier of the preform charge. As used herein and in the appended claims, the phrase "accessible via the [physical element]" means that whatever it is that is accessible, can be accessed directly or indirectly via the physical element. Thus, information that is "accessible via the tag" can include information that is actually stored in/on the tag, or information that is stored elsewhere (a QMS, processor-accessible memory) but is retrievable using certain identifying/locating information stored in/on the tag.

This information can be used in many ways to improve manufacturing efficiency and economics, and is often archived for future reference by a QMS to ensure specifications are consistently met.

The Preform Charge IDs are next associated with a specified preform-charge cartridge. The preform charge cartridge is itself described by unique characterizing information, including, without limitation, any one or more of:

(i) a specification pertaining to the type(s) of preform charges it can accommodate;

(ii) its capacity for preform charges;

(iii) the number of preform charges actually in the cartridge;

(iv) the processing specification for the preform charges in the cartridge;

(v) a shipment date of the cartridge;

(vi) a shipment condition of the cartridge;

(vii) date of receipt (at compression-molding facility);

(viii) condition of preform charges/cartridge on receipt at the molding facility;

(ix) the date on which preform charges are dispensed from the preform charge cartridge.

It will be appreciated, of course, that some of this information (i.e., characterizing information vii, viii, and ix) is only available after shipment of the preform charge cartridge to the compression-molding facility.

Similar to the manner of preform-charge serialization, the pertinent information quantifying the preform charge cartridge is serialized into a unique preform-cartridge ID: Cartridge ID 1.0. Depending on the processing requirements of the preform-charge fabricator and the molder, the cartridge IDs can be serialized via the same type of tags as the preform-charge IDs. Again, any suitable method for and syntax of cartridge ID serialization may suitably be used.

Figure 8:
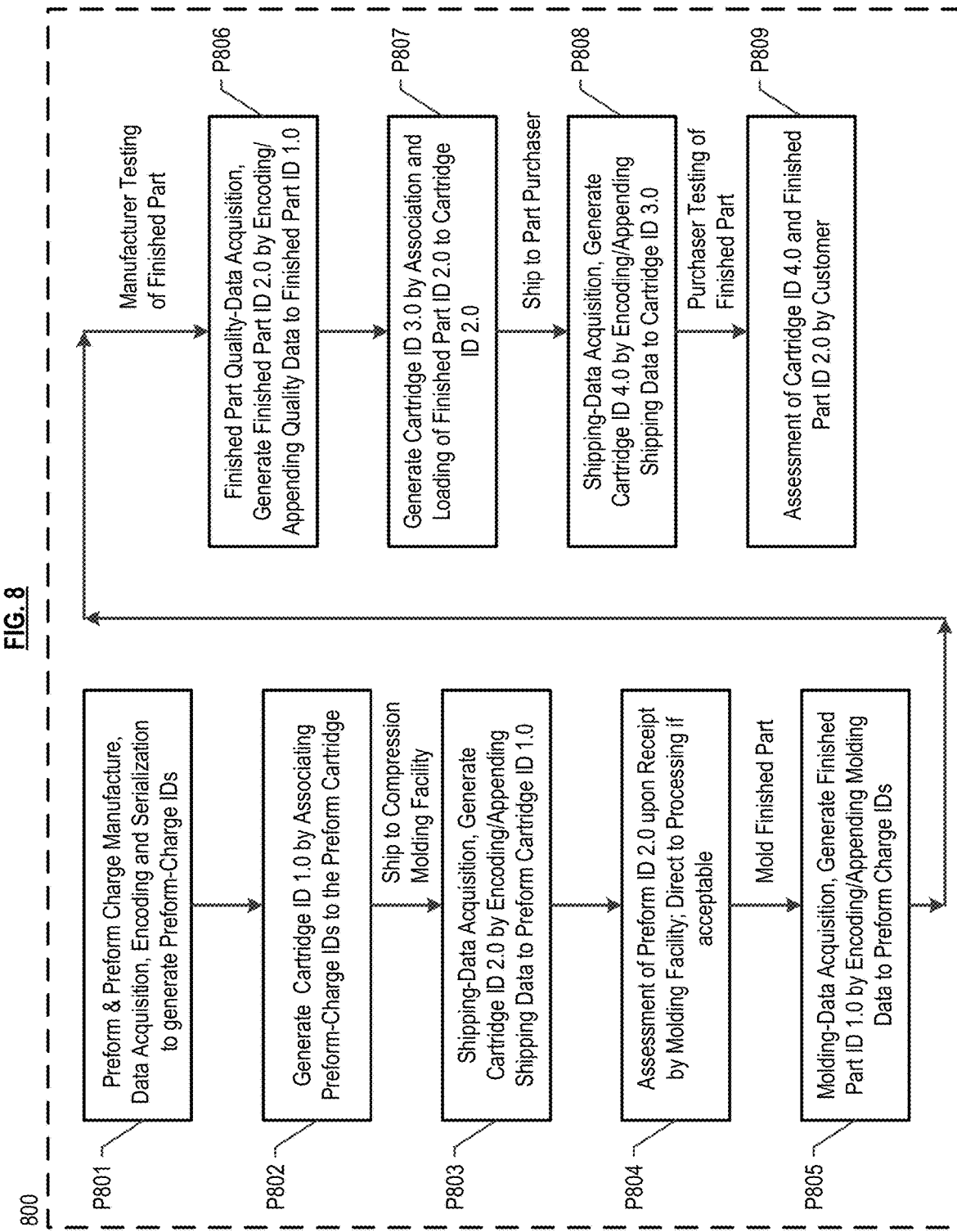
FIG. 8 depicts a method in accordance with an illustrative embodiment of the invention.

Referring now to method 800 of FIG. 8, the foregoing discussion summarizes operations P801 and P802. The preform charge cartridge is then shipped to the compression molding facility. In accordance with operation P803, during the course of shipment, certain data is captured. For example, it is advantageous to record conditions and events occurring during transfer of the cartridge, since such conditions and events could affect the processing of the charges. By way of example, excess humidity within the preform charge cartridge, which can be absorbed by the resin within the preform charges, could negatively impact finished part quality. Or severe impacts and accelerations could damage the union or organization of subunits (preforms) of a preform charge, thus negatively impacting mold registration and fiber alignment within the finished part. Such conditions could be more or less important as a function of the raw materials used (notably, the resin), or the geometry of the preform charge cartridge (relatively more or less complex, etc.). Methods of data acquisition during shipping are accomplished via aspects of the preform charge cartridge via well-known techniques.

An updated cartridge ID—Cartridge ID 2.0—is generated by appending, to the data of Cartridge ID 1.0, the data captured during shipping.

In operation P804, upon receipt of the preform charge cartridge, the compression molding facility assesses the information associated with Cartridge ID 2.0 and the Preform Charge ID to ensure compliance, determine whether potential defects or issues are attributable to the supplier or shipper, and allocate processing requirements. This assessment could be manual or automated, as the information-transfer method described herein is applicable to either approach. The data associated with the Preform Charge ID provides the compression-molding parameters for processing the preform charges into the desired finished part. Such parameters may include, without limitation, a mold specification, temperature-cycling, pressure cycling, and a finished-part specification.

A compression-molding sequence is then performed per the processing specifications encoded by the Preform Charge IDs. This sequence can either be controlled manually by operators that scan the IDs and selecting parameters, or automatically by automation equipment that scans the IDs and communicates to process controls.

Per operation P805, pertinent information is acquired during the compression-molding process. This information is subsequently appended to the Preform Charge IDs, generating Finished Part ID 1.0. In accordance with operation P806, finished part quality testing is then performed, and that data is subsequently appended to the Finished Part ID. 1.0 to generate Finished Part ID 2.0. Alternatively, the data captured during and after molding could be appended in a single step. In either case, the Preform Charge IDs have transitioned to "Finished Part IDs." The Finished Part IDs carry both the serialized information of the Preform Charge ID and the serialized information of the compression molding process, in addition to quality data acquired after molding is complete. Such information includes, without limitation, date, ambient conditions, actual temperature cycle, actual pressure cycle, actual ejection force, part dimensions, part photograph, and/or part mass. This information can be used by manufacturers and customers to ensure compliance, and, as need be, to troubleshoot defects.

Given a similar geometry/size between a preform charge and the subsequent finished part, preform charge cartridges are generally compatible for both. And, consequently, the preform charge cartridge that receives the finished parts will often be the cartridge that conveyed the preform charge that formed those parts. But this is not required, and if different preform charge cartridges are used to transport the preform charges and transport the finished parts, it is essential that steps are taken to ensure that the relevant information is preserved.

During molding, information can be imparted by mold etching and radio frequency identification (RFID) chip overmolding. Mold etching is performed by etching the inverse/negative format of the necessary information into the surface of the mold, thereby imparting the physical geometry of the information to every part produced from the mold. RFID chips can be overmolded into a part during the process, providing a unique identifier embedded within the part that can be interrogated to ascertain the encoded information.

Post-process serialization imparts information onto finished parts. This is done, for example, by etching information directly onto parts, adhering information-bearing labels to parts, or by printing directly onto the part.

For embodiments of the method employing Preform Charge RFID tags, information is simply serialized into the embedded tag to create the Finished Part ID. Embodiments that are based on correlating a part with a tag on the preform charge cartridge return each finished part to the compartment in the preform charge cartridge in which the part's constituent preform charge was originally stored, updating the associated tag to reflect the finished part ID. Alternatively, the correlated tag information of the finished part ID can be transferred directly onto the finished part surface.

The finished parts are placed in the preform-cartridge, and, in accordance with operation P807, Cartridge ID 2.0 (P803) is updated to Cartridge ID 3.0 by appending data such as shipment date, shipment quantity, purchase-order number, destination, customer, and cartridge condition.

The finished parts are then shipped to the part purchaser. Per operation P808, shipment data captured during shipment of the finished part to the part purchaser is appended to Cartridge ID 3.0, thereby generating Cartridge ID 4.0. In accordance with operation P809, the data corresponding to Cartridge ID 4.0 and Finished Part ID 2.0 are assessed upon receipt by the parts purchaser. The purchaser's assessment of these IDs facilitates compliance to specifications and transparency to supply chains.

For applications requiring exceedingly stringent specifications, the information transferred via the methods described herein can be utilized for authentication and/or process control. For example, if transferred information is deemed to be out of specification or inauthentic, production of the associated parts can be addressed as necessary before expending superfluous resources.

Figure 9:
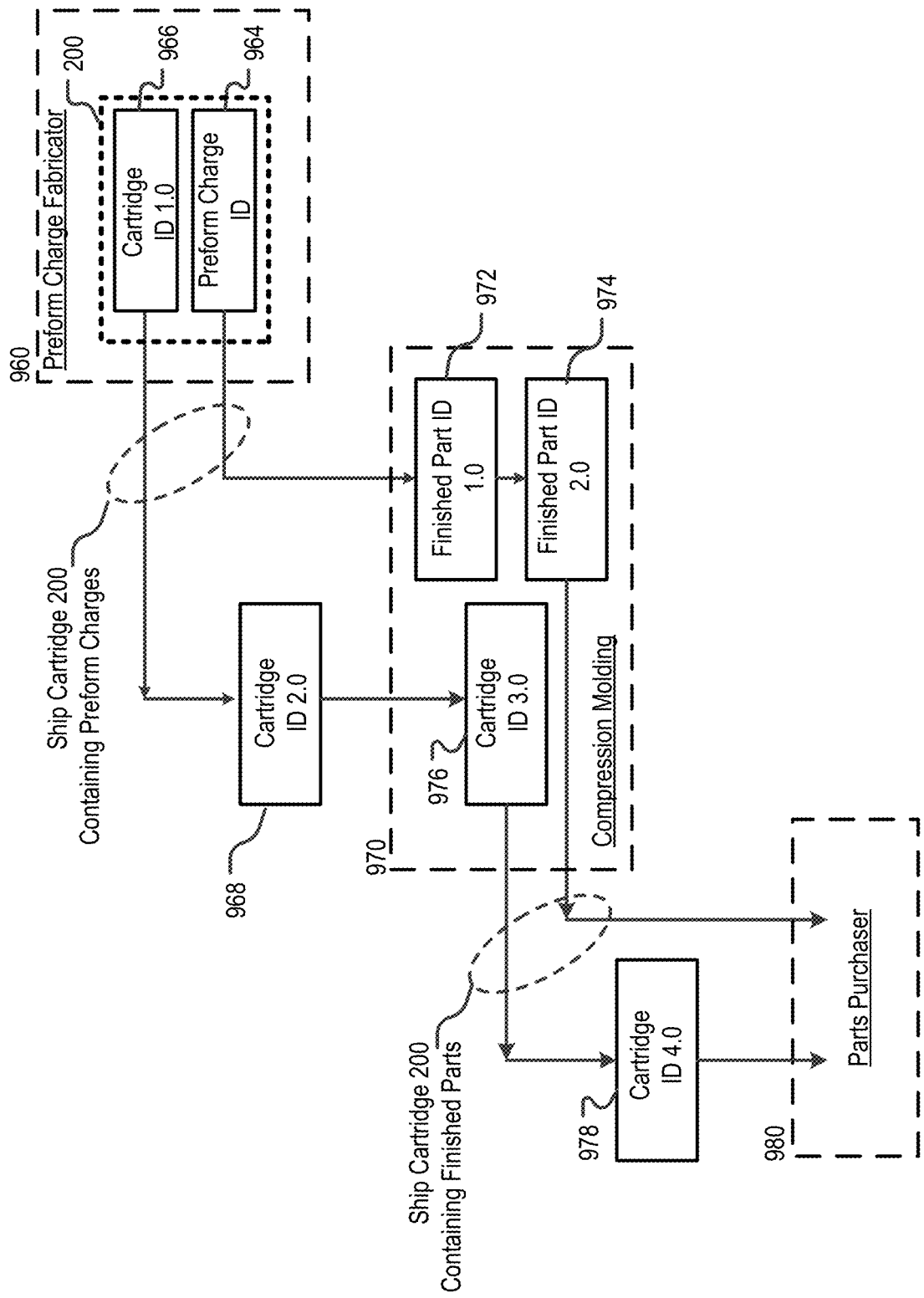
FIG. 9 depicts the flow of information to various stake holders, as results from the method of FIG. 8.

FIG. 9 depicts the flow/generation of information, as identified in FIG. 8, to various stake holders in the fabrication and purchase of a fiber-composite part via preform charges.

Preform charge fabricator 960 fabricates preform charges, generates Preform Charge ID 964 and Cartridge ID 1.0 966, loads preform charges into a preform charge cartridge, as disclosed herein. The preform charge cartridge, appropriately tagged with the Preform Charge ID and Cartridge ID 1.0, is shipped to a compression molding facility 970. Data captured while the preform-charge cartridge is in transit is encoded and appended to Cartridge ID 1.0 966, generating Cartridge ID 2.0 968.

Compression-Molding facility 970 receives the preform-charge cartridge and unloads the preform charges, places them in an appropriate mold, and creates finished parts. Data captured during the molding process is appended to Preform Charge ID to generate Finished Part ID 1.0 972. Data captured during testing of the finished parts is appended to Finished Part ID 1.0 generating Finished Part ID 2.0 974. The finished parts are loaded into the preform charge cartridge that conveyed the preform charges (or another preform charge cartridge if the finished parts are not appropriate for placement in preform charge cartridge 200) and information is appended to Cartridge ID 2.0 968 generating Cartridge ID 3.0 976.

The preform-charge cartridge, appropriately tagged with the Cartridge ID 3.0 976 and Finished Part ID 2.0 974, is shipped to Parts Purchaser 980. Data captured while the preform-charge cartridge is in transit is encoded and appended to Cartridge ID 3.0 976, generating Preform charge cartridge ID 4.0 978.

Parts Purchaser 980 receives the preform-charge cartridge and assesses the information associated with Cartridge ID 4.0 978 and Finished Part ID 2.0 974.

Tables I through III below show non-limiting examples of the type of information that can be included in a Preform Charge ID, the various iterations of Cartridge IDs, and Finished Part IDs, as they relate to different stake holders as depicted in FIG. 9.

TABLE I

At the Preform Charge Fabricator
Preform Charge Fabricator

| Preform Charge ID | Cartridge ID 1.0 |
|---|---|
| Raw Material Source/Analysis | Charge Specification |
| Preform-Charge Source | Charge Quantity |
| Preform-Charge Fabrication Conditions | Cartridge Specification |
| Preform-Charge Specification | Cartridge Condition |

TABLE I-continued

At the Preform Charge Fabricator
Preform Charge Fabricator

| | |
|---|---|
| Preform Charge ID | Cartridge ID 1.0 |
| Preform-Charge Quality<br>Preform-Charge Quantity<br>Mold Specification<br>Molding Process Specification | Shipping Date |

TABLE II

At the Compression Moldina Facility
Compression Molding Facility

| Preform Charge ID | Cartridge ID 2.0 |
|---|---|
| Same as Preform Charge ID in Table I | Same as Cartridge ID 1.0 +<br>Shipping conditions |
| Finished Part ID 1.0 | Cartridge ID 3.0 |
| Same as Preform Charge ID +<br>Finished Part Specification<br>Molding Conditions | Same as Cartridge ID 2.0 +<br>Cartridge Condition<br>Finished Part Specification<br>Finished Part Quantity<br>Shipping Destination<br>Ship Date |
| Finished Part ID 2.0 | |
| Same as Finished Part ID 1.0 +<br>Finished Part Quality<br>Authentication Certificate<br>Production Compliance | |

TABLE III

At the Parts Purchaser
Parts Purchaser

| Finished Part ID 2.0 | Cartridge ID 4.0 |
|---|---|
| Same as above | Same as Cartridge ID 3.0 +<br>Shipping conditions |

Figure 10:
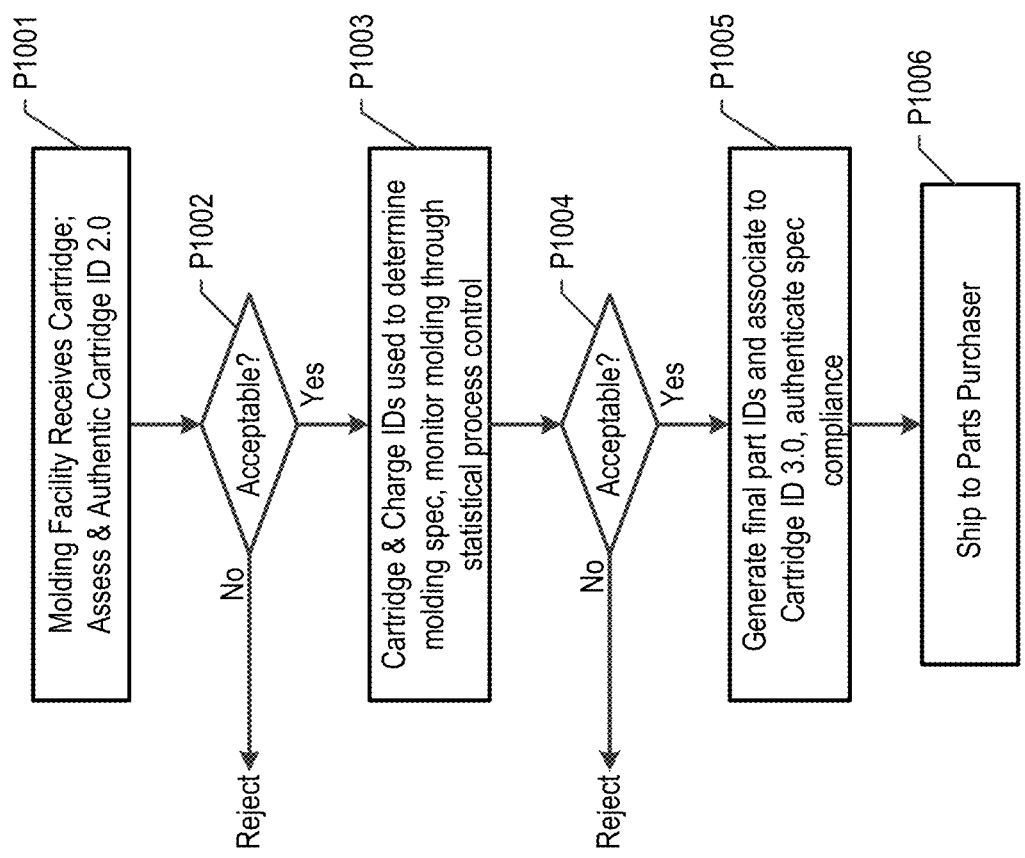
FIG. 10 depicts logical information flow from the perspective of the compression molding facility that is converting preform charges into finished parts.

FIG. 10 depicts the use and generation of serialized information at a compression-molding facility that is converting preform charges into finished parts. In the embodiment depicted in FIG. 10, strict specifications are assumed to be required for the part, so the serialization method described herein is used to ensure and validate that specifications are met in multiple steps of the molding process.

At operation P1001, the molding facility receives a preform charge cartridge loaded with preform charges. The information associated with Cartridge ID 2.0 is assessed and the cartridge is authenticated. If there are problems, either apparent on visual inspection or based on the information, some or all of the preform charges are rejected at operation P1002. If acceptable, the requisite information for molding the parts from the preform charges is obtained from Preform Charge ID at P1003 and the part is then molded. The molding process is monitored, such as through statistical process control. In some embodiments, a Finished Part ID 1.0 is generated that includes the information from the Preform Charge ID as well as the molding conditions.

If the specification for the part, as provided via the Preform Charge ID, is not met, the molded parts are rejected at P1004. If the specification has been met, and a Finished Part ID 1.0 has been previously generated, then, at P1005, parts quality, and an authentication certificate that validates compliance with the part specification is appended to Finished Part ID 1.0, thereby generating Finished Part ID 2.0. Otherwise, a single "Finished Part ID" that includes the information that was otherwise associated with Finished Part ID 1.0, as well as the parts quality and authentication certificate, is generated. Additionally, Cartridge ID 2.0 is updated with new information (see, Table II, above), generating Cartridge ID 3.0.

At P1006, the finished parts are loaded into the preform charge cartridge that originally conveyed the preform-charges, if appropriate. During shipping to the parts purchaser, Cartridge ID 3.0 is updated with information, as depicted in Table III, above, generating Cartridge ID 4.0.

The availability of the requisite information, as enabled through the present serialization method, provides the basis for validation at each handling operation. Such information was heretofore not available. For example, here, the use of cloud-based statistical process control to accept or reject finished part IDs after molding is contingent upon compliance to the specifications serialized and transferred via the reform Charge IDs and/or the Cartridge IDs. This facilitates increased efficiency, as potentially defective parts can be rejected prior to unnecessary processing resources being expended.

As previously discussed, methods of information exchange integrated into a preform charge cartridge can be used to identify both the preform charge cartridge itself and its constituent preform charges. Since preform charge cartridges employ precise indexing features for the handling of preform charges, the locations of preform charges (or finished parts) within the cartridge are fixed. Information exchange methods can thus be situated in fixed relation to these locations to ensure reliable association of preform charge IDs. That is, for embodiments in which a preform charge ID is not affixed directly to the charge, the ID can instead be stored in an information exchange aspect of the cartridge in fixed relation to the location of the preform-charge. Since preform charge cartridges are compatible for charges or finished parts of the same specification, information exchange methods are equally applicable to each.

Since the use of preform charge cartridges is most advantageous for high-volume applications, it is useful to consider logistic efficiency regarding cartridge utilization. As the sequence of the present invention is generally directional (i.e., preform-charge fabricators will ship preform charges to compression molders, but molders will not ship finished parts to preform-charge fabricators), the return and resupply of empty preform charge cartridges is necessary to meet ongoing demand. The cycling of preform charge cartridges meeting a single specification among the relevant parties to support ongoing production of a given finished part specification can be considered a preform-cartridge economy, as defined by the supply and demand of cartridges for that part.

Embodiments of the present invention can be conducted via any processes, logistic networks, information-management systems, and stakeholders (e.g. manufacturers, molders, customers, etc.) by which preform charge cartridges are utilized. In some embodiments in which relevant data is used to validate specifications and control operating procedures, the shipping of cartridges need not necessarily follow the order of preform charge fabricator→compression molding facility→customer. Rather, relevant data can be used to direct cartridge shipments, for example, if specifications are not met or authentication is not valid.

Information and data relevant to the present method is typically represented digitally in a binary format. Such information and data can be stored and accessed by stakeholders as applicable via a central repository, such as a cloud server, or locally, by an on-site server, provided that a network by which to transfer the information is accessible. Any combination of information storage and network may suitably be used. For example, a local QMS system could be used to record and serialize manufacturing data into preform-charge IDs, after which relevant information is uploaded to a cloud server accessible by relevant stakeholders. Given the precise and consistent nature of processes associated with the method, information can, in some embodiments, be stored and managed remotely.

Depending on applicable requirements, various embodiments of the invention may employ such information databases and networks to affect the dynamics of the method at any point. For example, customers can monitor relevant authentication data during production to validate specifications as required. If specifications are not met at any point, the customer can decide to reject the parts prior to receipt. Furthermore, quality data relevant to the method can be continually assessed during production through statistical process control and/or machine learning algorithms. Given the large amount of data potentially generated by high-volume production, such embodiments of information analysis enabled by the method can be used to control process parameters or troubleshoot defects far more effectively than human analysis. Such practices reduce unnecessary resource expenditure and ensure compliance to customer requirements.

In conjunction with the present disclosure, those skilled in the art will know how to make and use information acquisition methods, data serialization syntaxes, protocols, and formats, and data communication aspects, for use in conjunction with embodiments of the invention.

It is to be understood that the disclosure describes a few embodiments and that many variations of the invention can easily be devised by those skilled in the art after reading this disclosure and that the scope of the present invention is to be determined by the following claims.

What is claimed:

1. A cartridge for storing and conveying a plurality of preform charges, the cartridge comprising:
    a housing; and
    a plurality of cells arranged within the housing, each cell including a first wall and a second wall, wherein the first wall is disposed within a perimeter of the second wall, and further wherein the first wall defines a retainer, the first wall having a top and a bottom, wherein the bottom of the first wall defines a first perimeter, and wherein the first perimeter defines a first internal area, wherein in use, the retainer receives respective ones of the preform charges;
    a first indexing feature, wherein the first indexing feature is physically adapted to engage a complementary mating feature located proximal to compression-molding equipment, wherein engagement therebetween positions the cartridge in a defined location with respect to the compression-molding equipment, the first indexing feature thereby facilitating robotic removal of the preform charges from the cartridge.

2. The cartridge of claim 1 wherein the shape of the first perimeter and a shape of the received preform charge are the same.

3. The cartridge of claim 1 wherein the top of the first wall defines a second perimeter, wherein the second perimeter defines a second internal area, wherein the second internal area is larger than the first internal area, the first wall thereby tapering inwardly from top to bottom, the larger second internal area functioning as an ingress feature to facilitate receiving the preform charge in the retainer.

4. The cartridge of claim 1 further comprising a second indexing feature, wherein the second indexing feature associates respective ones of the preform charges with respective ones of the cells.

5. The cartridge of claim 1 wherein the first indexing feature is disposed in a gap between the second wall and the first wall.

6. The cartridge of claim 1 comprising at least one actuation feature, wherein, when the first indexing feature engages the complementary feature, the actuation feature initiates an action selected from the group consisting of: deploying a slide for transferring preform charges to a mold cavity, retracting a plate to release one or more preform charges from one or more cells, and information transfer from the cartridge to a data processing system associated with the compression molding equipment.

7. The cartridge of claim 1 comprising at least one sensor.

8. The cartridge of claim 7 wherein the at least one sensor is a hygrometer.

9. The cartridge of claim 8 further comprising a heater and fan, wherein, when the hygrometer determines that humidity in the cartridge exceeds a predefined level, the heater and fan are activated.

10. The cartridge of claim 7 further comprising a display for presenting information about a status of the preform charges, as obtained from the at least one sensor.

11. The cartridge of claim 1 wherein the plurality of cells are arranged in a 2-dimensional array.

12. The cartridge of claim 1 wherein the plurality of cells are arranged in a 3-dimensional array.

13. A cartridge for storing and conveying a plurality of preform charges, the cartridge comprising:
    a housing;
    a plurality of preform charges, each preform charge comprising an assemblage of fiber-bundle-based preforms, the preform charge having a first fiber alignment; and
    a plurality of cells arranged within the housing, wherein the plurality of preform charges are disposed in the plurality of cells, and wherein each cell is physically adapted to prevent a received preform charge from moving within the cell, thereby maintaining the first fiber alignment during conveyance of the cartridge.

14. The cartridge of claim 13 comprising:
    first serialization means for storing characterizing information pertaining to each preform charge; and
    second serialization means for storing characterizing information pertaining to the cartridge.

15. The cartridge of claim 14 wherein the characterizing information pertaining to each preform charge includes:
    i) characteristics of the raw materials that compose the preform;
    ii) characteristics of the preform charge as fabricated.

16. The cartridge of claim 14 wherein the characterizing information pertaining the cartridge includes:
    i) a specification defining a design of the preform charges;
    ii) a capacity of the cartridge for preform charges;
    iii) a number of preform charges in the cartridge;
    iv) an assessment of the physical condition of the cartridge; and
    v) a date that the cartridge is shipped to a facility having the compression molding process.

17. The cartridge of claim 14 comprising at least one sensor for determining a condition of the preform charges, wherein the sensor is selected from the group consisting of a hygrometer, a timer, a camera, a weigh scale, an accelerometer, and a temperature measuring element.

18. The cartridge of claim 14 comprising a feature by which the cartridge is indexed to compression-molding equipment, wherein, when indexed, the cartridge is positioned at a defined location with respect to the compression-molding equipment, the feature thereby facilitating robotic removal of the preform charges from the cartridge.

19. A cartridge for storing and conveying a plurality of preform charges, comprising:
a housing;
a plurality of cells arranged within the housing, each cell including a first wall and a second wall, wherein the first wall is disposed within a perimeter of the second wall, and further wherein the first wall defines a retainer, the first wall having a top and a bottom, wherein the bottom of the first wall defines a first perimeter, and wherein the first perimeter defines a first internal area, wherein in use, the retainer receives respective ones of the preform charges;
a plurality of first tags, and
the plurality of preform charges, wherein one first tag of the plurality thereof is associated with respective ones of the preform charges, wherein first characterizing information pertaining to the associated preform charge is accessible via the first tag, wherein the first characterizing information comprises at least one of characteristics of raw materials that compose the preform charge and characteristics of the preform charge, and further wherein the first characterizing information for the preform charge defines a preform-charge ID.

20. The cartridge of claim 19 comprising a second tag, wherein the preform-charge ID associated with each preform charge is associated with the cartridge, and wherein second characterizing information pertaining to the cartridge is accessible via a second tag.

* * * * *